US010389201B2

(12) United States Patent
Hamagishi et al.

(10) Patent No.: US 10,389,201 B2
(45) Date of Patent: Aug. 20, 2019

(54) MOTOR WITH SEAL MEMBER HAVING UPPER AND LOWER SEAL PORTIONS AND INTERVENING PORTION POSITIONED IN RADIAL OPENING

(71) Applicant: Nidec Corporation, Minami-ku, Kyoto (JP)

(72) Inventors: Kenichiro Hamagishi, Kyoto (JP); Hironori Kizaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 651 days.

(21) Appl. No.: 15/075,909

(22) Filed: Mar. 21, 2016

(65) Prior Publication Data

US 2016/0294245 A1     Oct. 6, 2016

(30) Foreign Application Priority Data

Mar. 31, 2015  (JP) ................. 2015-073263

(51) Int. Cl.
*H02K 5/00* (2006.01)
*H02K 5/10* (2006.01)
*H02K 5/14* (2006.01)

(52) U.S. Cl.
CPC .............. *H02K 5/10* (2013.01); *H02K 5/148* (2013.01)

(58) Field of Classification Search
CPC .. H02K 5/10; H02K 5/12; H02K 5/14; H02K 5/148; H02K 5/132; H02K 5/136; H02K 5/146
USPC ..................................................... 310/87–89
See application file for complete search history.

(56) References Cited

U.S. PATENT DOCUMENTS

| | | | | | |
|---|---|---|---|---|---|
| 2,300,957 | A | * | 11/1942 | Miner, Jr. ................ | H02K 5/04 310/40 R |
| 4,959,576 | A | * | 9/1990 | Horibe ................... | H02K 5/141 310/232 |
| 5,010,265 | A | * | 4/1991 | Tanaka .................... | F02N 15/00 290/48 |
| 5,608,280 | A | * | 3/1997 | Tamemoto ............. | H01R 39/06 310/237 |
| 6,515,398 | B1 | * | 2/2003 | Fudono .................. | H02K 5/141 310/239 |

(Continued)

FOREIGN PATENT DOCUMENTS

JP         2014-039381 A     2/2014

*Primary Examiner* — Bernard Rojas
*Assistant Examiner* — Maged M Almawri
(74) *Attorney, Agent, or Firm* — Cantor Colburn LLP

(57) ABSTRACT

A motor may include an armature; a cylindrical housing; a brush card assembly; a cylindrical bracket positioned under the brush card assembly and fixed to the housing; and a seal member positioned between the housing and the bracket and made of elastomer. The housing and the bracket may be made of metal. The brush card assembly may include a cylindrical portion and a flange portion. The seal member may include an upper portion and a lower portion. A housing lower end surface and a bracket upper end surface may face each other. The housing lower end surface and the bracket upper end surface may include contact portions contacting and separation portions separated in the axial direction. The motor may include a radial opening positioned axially between the separation portions and open in a radial direction. The seal member may include an intervening portion positioned in the radial opening.

20 Claims, 10 Drawing Sheets

(56) References Cited

U.S. PATENT DOCUMENTS

| | | | | |
|---|---|---|---|---|
| 6,756,711 | B2* | 6/2004 | Matsuyama | H02K 5/225 310/68 B |
| 7,109,617 | B2* | 9/2006 | Mizutani | H01R 39/383 29/596 |
| 7,671,505 | B2* | 3/2010 | Yamamoto | H02K 5/148 310/239 |
| 7,687,967 | B2* | 3/2010 | Mashino | H01R 39/385 310/239 |
| 7,859,148 | B2* | 12/2010 | Mizutani | H01R 39/38 310/238 |
| 8,421,300 | B2* | 4/2013 | Kokubu | H02K 5/148 310/239 |
| 8,723,381 | B2* | 5/2014 | Kokubu | H02K 5/148 310/239 |
| 2011/0057526 | A1* | 3/2011 | Kokubu | H02K 5/148 310/83 |
| 2011/0273042 | A1* | 11/2011 | Isoda | H02K 11/046 310/63 |
| 2013/0020886 | A1* | 1/2013 | Chan | F02N 15/006 310/43 |
| 2013/0193789 | A1* | 8/2013 | Kokubu | H02K 5/148 310/83 |
| 2013/0220073 | A1* | 8/2013 | Suto | F16H 1/16 74/606 R |

* cited by examiner

US 10,389,201 B2

MOTOR WITH SEAL MEMBER HAVING UPPER AND LOWER SEAL PORTIONS AND INTERVENING PORTION POSITIONED IN RADIAL OPENING

CROSS REFERENCE TO RELATED APPLICATION

The present invention claims priority under 35 U.S.C. § 119 to Japanese Application No. 2015-073263 filed Mar. 31, 2015, the entire content of which is incorporated herein by reference.

FIELD OF THE INVENTION

At least an embodiment of the present invention relates to a motor.

BACKGROUND

Among typical types of electric motor, there is a motor which includes a seal portion for sealing a gap between members configuring an outer frame of the motor. For example, Japanese Patent Application Publication No. 2014-039381 discloses an electric motor which includes a seal portion for sealing between an outer flange portion of a yoke and a peripheral edge portion of a bracket. With the seal portion, this electric motor may be configured to prevent water from infiltrating into the motor, such that the electric motor may be used outdoors, for example, on a vehicle, and the like.

In the electric motor as described above, the outer flange portion of the yoke contacts the peripheral edge portion of the bracket. Similarly, the seal portion in the motor is disposed on a radially inner side than the radial outer edge of said portion where the yoke contacts the bracket.

In this configuration, however, water may infiltrate between contact portions where the yoke and the bracket contact each other from the radial outer edge, such that the contact portions between the yoke and the bracket can be corroded. As a result, the waterproof property of the electric motor may be degraded due to the corrosion.

Further, the corrosion of the contact portions between the yoke and the bracket may spread radially inward, such that the corrosion may spread up to a portion positioned in the seal portion of the yoke and the bracket. In this case, the sealing condition provided by the seal portion between the yoke and the bracket may be insufficient and thus the waterproof property of the electric motor may be further degraded.

SUMMARY

A first exemplary embodiment of the present disclosure is a motor which comprises a shaft having its center on a vertically extending center axis. The motor includes: an armature fixed to the shaft; a cylindrical housing having a lower opening which is open toward a lower side and receives the armature; a brush card assembly positioned in the lower opening portion and supplying a current to the armature; a cylindrical bracket positioned under the brush card assembly and fixed to the housing; and a seal member made of elastomer and positioned between the housing and the bracket. The housing and the bracket are made of metal. The brush card assembly has a brush card cylindrical portion having a cylindrical shape and enclosing the shaft in a circumferential direction, and a brush card flange portion extending radially outward from the brush card cylindrical portion. The seal member has an upper seal portion positioned between a top surface of the brush card flange portion and the housing and a lower seal portion positioned between a bottom surface of the brush card flange portion and the bracket. A housing lower end surface, which is a lower end surface of the housing, and a bracket upper end surface, which is an upper end surface of the bracket, face each other in an axial direction. The housing lower end surface and the bracket upper end surface have contact portions where they are in contact with each other, and separation portions where they are separated away from each other in the axial direction. The motor is provided with a radial opening which is positioned between the separation portion of the housing lower end surface and the separation portion of the bracket upper end surface in the axial direction, and is open in a radial direction. The seal member has an intervening portion positioned in the radial opening.

According to the first exemplary embodiment of the present disclosure, the motor having a structure capable of improving the waterproof property is provided.

The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Hereinafter, a motor according to a first exemplary embodiment of the present disclosure will be described with reference to the accompanying drawings. Further, the scope of the present disclosure is not limited to the following embodiments, but may be arbitrarily changed within the technical spirit of the present disclosure. Further, in the following drawings, for easy understanding of each component, a scale, the number, etc., of each structure may be different from those of actual structures.

Further, the drawings illustrate an XYZ coordinate system as an appropriate three-dimensional orthogonal coordinate system. In the XYZ coordinate system, Z-axis direction is a direction parallel with an axial direction of a center axis J illustrated in FIG. 1. X-axis direction is a direction orthogonal to the Z-axis direction and is defined as a direction in which a connector part 53 protrudes. Y-axis direction is defined as a direction orthogonal to both the X-axis direction and the Z-axis direction.

Further, in the following description, the direction (Z-axis direction) in which the center axis J extends is defined as the vertical direction. A positive side (+Z side) in the Z-axis direction is defined as an 'upper side' and a negative side (−Z side) in the Z-axis direction is defined as a 'lower side'. It is to be understood that the terms of the vertical direction, the upper side and the lower side are used for explanation only, and they do not limit the actual positional relation or direction. Also, unless otherwise explained, a direction (Z-axis direction) parallel with the center axis J is simply referred to as 'axial direction', a radial direction having its center on the center axis J is simply referred to as 'radial direction', and a circumferential direction having its center on the center axis J (θZ direction), that is, a direction along the circumference of the center axis J, is simply referred to as 'circumferential direction'.

Furthermore, herein, descriptions such as being axially extended do not only refer to a case of strictly being extended in the axial direction (z-axis direction), but it may also include a case of being extended in a direction inclined at less than 45° relative to the axial direction. Also, descriptions such as being radially extended do not only refer to a case of strictly being extended in the radial direction, that is, the direction perpendicular to the axial direction (z-axis direction), but it may also include a case of being extended in a direction inclined at less than 45° relative to the radial direction.

Figure 1:
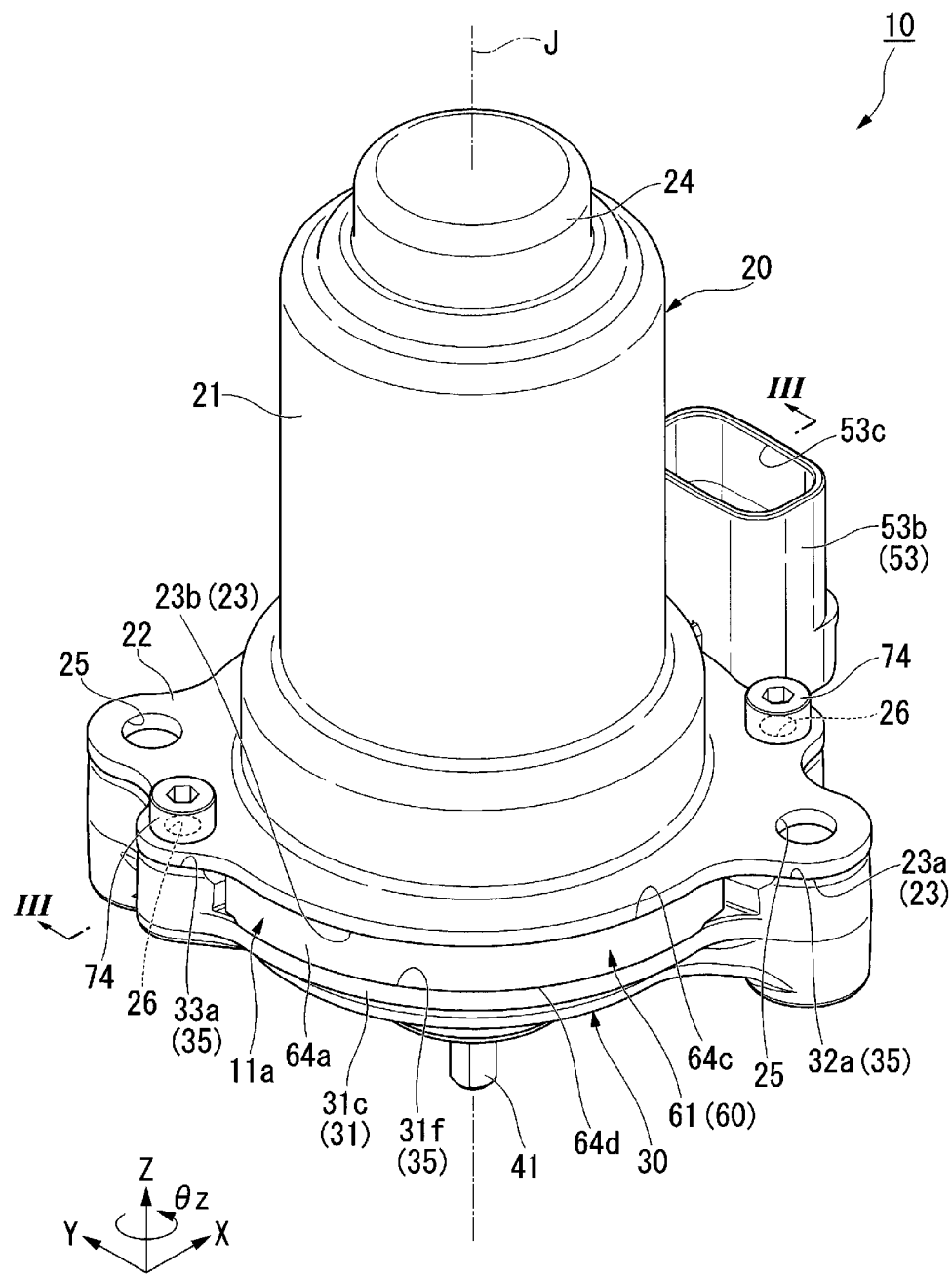
FIG. 1 is a perspective view illustrating a motor according to an exemplary embodiment of the present disclosure.
Figure 2:
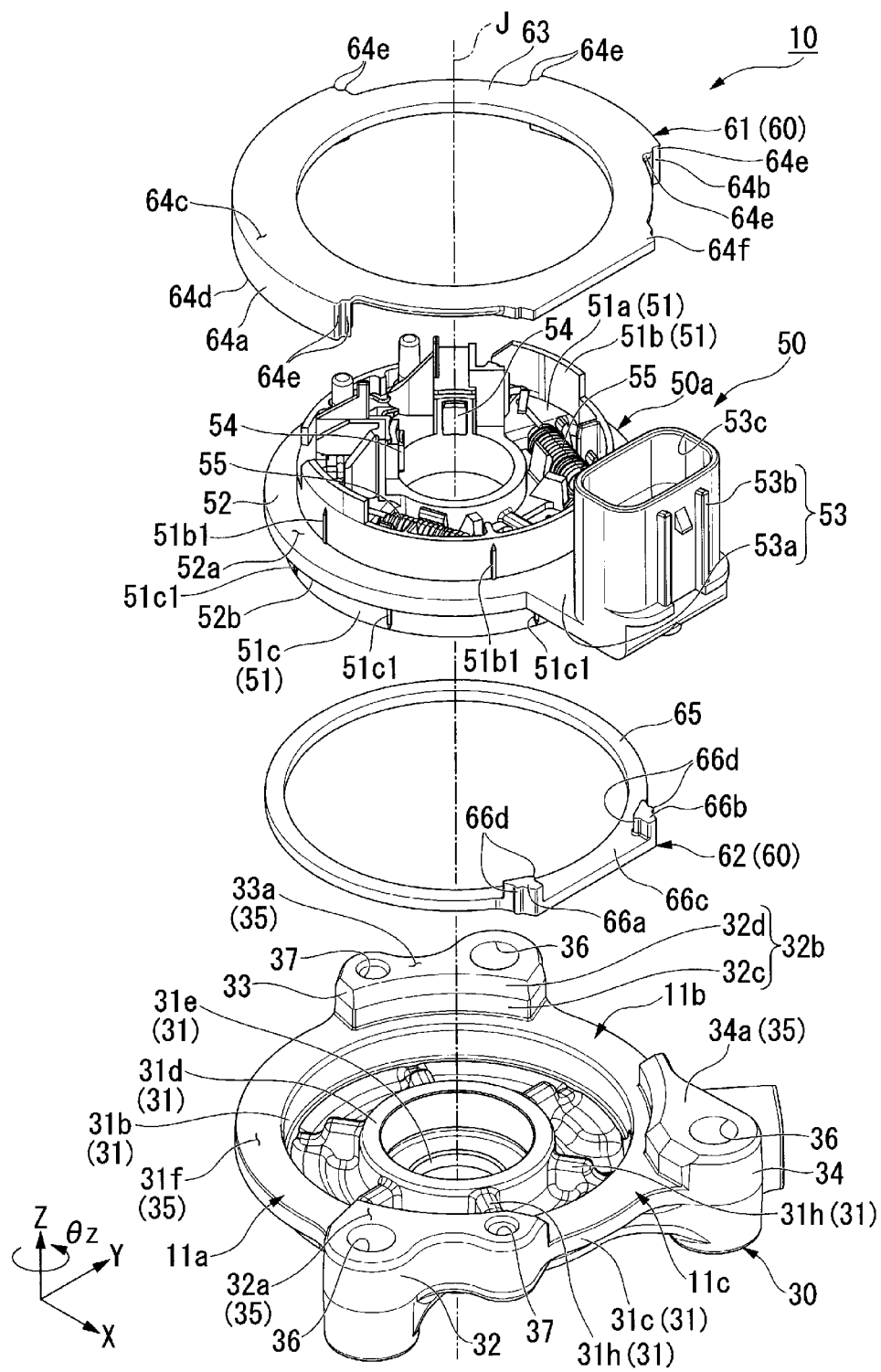
FIG. 2 is an exploded perspective view illustrating a portion of the motor according to the exemplary embodiment of the present disclosure.
Figure 3:
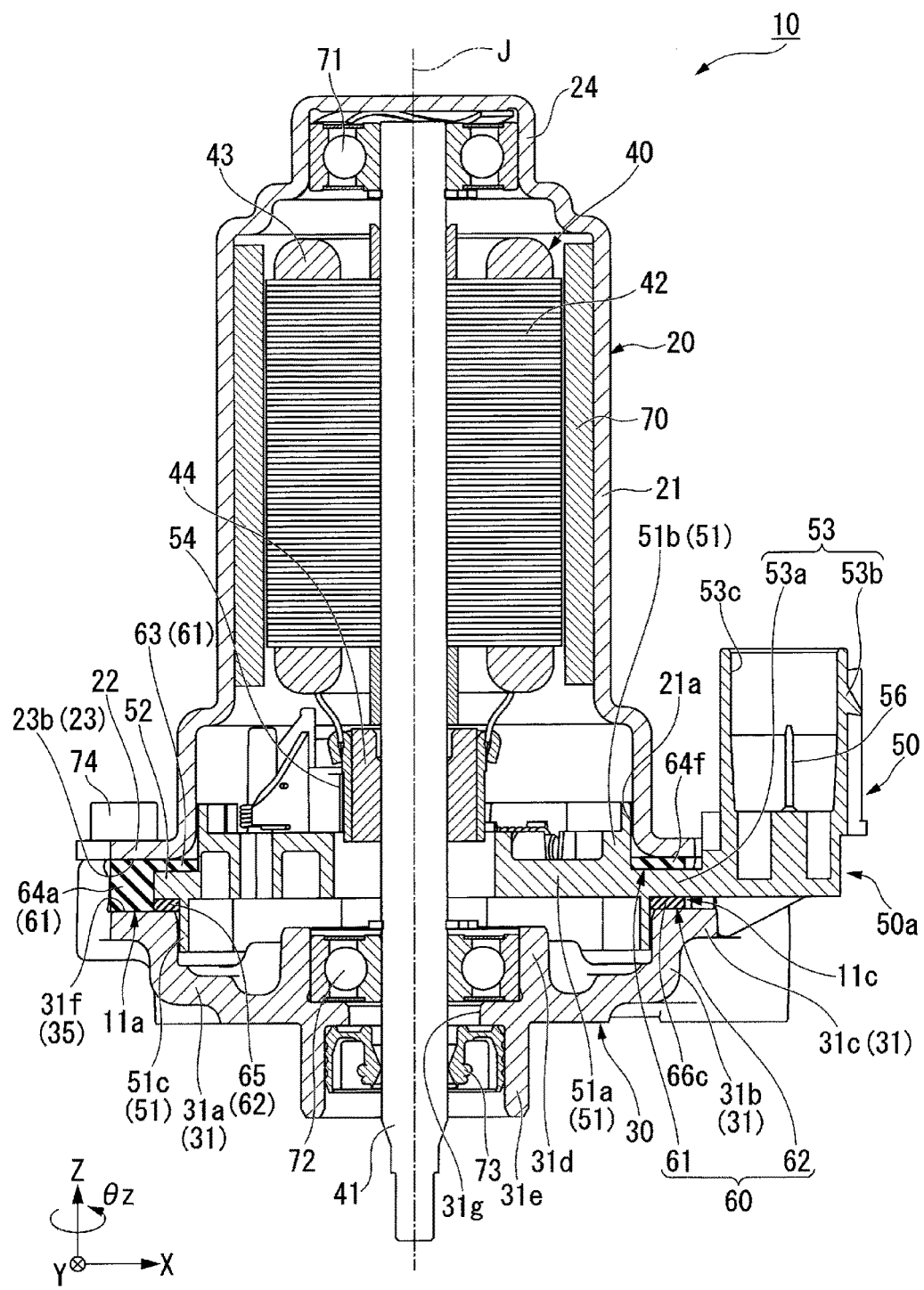
FIG. 3 is a diagram illustrating the motor according to the exemplary embodiment of the present disclosure and is a cross-sectional view taken along the line of FIG. 1.
Figure 4:
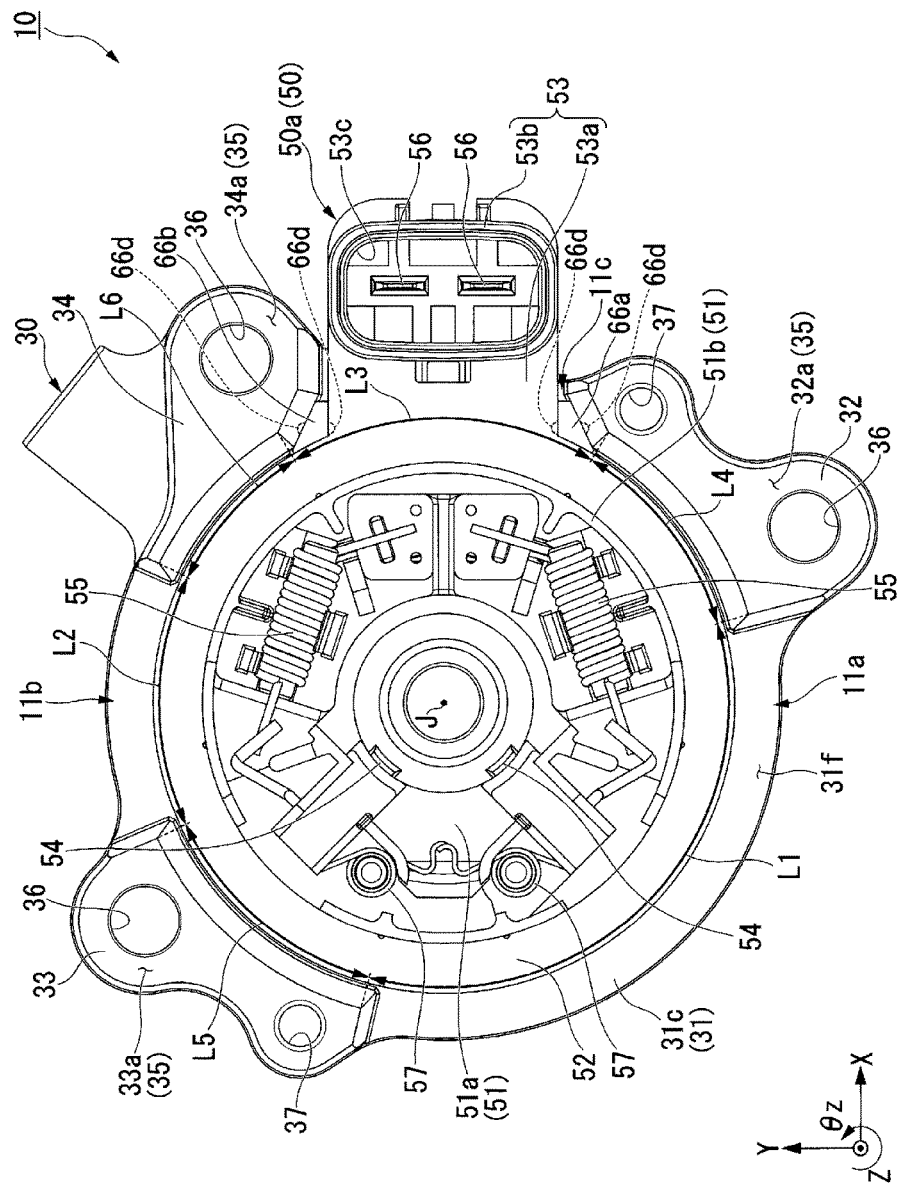
FIG. 4 is a plan view illustrating a portion of the motor according to the exemplary embodiment of the present disclosure.

FIGS. 1 to 4 illustrate a motor 10 according to the first exemplary embodiment of the present disclosure. FIG. 1 is a perspective view of the motor 10. FIG. 2 is an exploded perspective view of the motor 10 in which a housing 20, an armature 40, etc., are omitted. FIG. 3 is a cross-sectional view of the motor 10 of FIG. 1 taken along the line FIG. 4 is a plan view of the motor 10 in which the housing 20, the armature 40, etc., are omitted.

As illustrated in FIGS. 1 to 3, the motor 10 includes a housing 20, a bracket 30, a shaft 41, an armature 40, a commutator 44, a brush card assembly 50, a seal member 60, a magnet 70, a upper bearing 71, a lower bearing 72, and an oil seal 73.

As illustrated in FIG. 3, the shaft 41 has its center on a vertically (Z-axis direction) extending central shaft J. The shaft 41 is rotatably supported around (±θZ direction) the center axis J. A lower end of the shaft 41 is exposed outside the bracket 30 through an output shaft hole 31g which will be described in more detail in a subsequent section.

The armature 40 is fixed to the shaft 41. The armature 40 rotates around (±θZ direction) the center axis J, together with the shaft 41. The armature 40 has a core 42 and a coil 43. The core 42 is fixed to an outer circumferential surface of the shaft 41. The coil 43 is wound around the core 42.

The commutator 44 is positioned under the armature 40 and is fixed to the shaft 41. The commutator 44 is electrically connected to the coil 43. The commutator 44 contacts a brush 54 which will be described in more detail in a subsequent section. The coil 43 is supplied with a current from the commutator 44 through the brush 54. With this configuration, the armature 40 is excited.

The upper bearing 71 and the lower bearing 72 rotatably support the shaft 41. The upper bearing 71 is positioned above the armature 40. The upper bearing 71 is held by an upper bearing holding portion 24 of the housing 20, which will be described in more detail in a subsequent section. The lower bearing 72 is positioned below the commutator 44. The lower bearing 72 is held by a lower bearing holding portion 31d of the bracket 30, which will be described in more detail in a subsequent section.

A magnet 70 is fixed to an inner circumferential surface of the housing 20. The magnet 70 faces the armature 40 in the radial direction. An N pole and an S pole which are magnetic poles of the magnet 70 are alternately arranged in the circumferential direction. The magnet 70 may be a single member or may also be segmented into a plurality of magnets and disposed in the circumferential direction.

The oil seal 73 is held by an oil seal holding portion 31e which will be described in more detail in a subsequent section. The oil seal 73 serves to prevent oil outside the motor 10 from being infiltrated into the motor 10 through the lower bearing 72.

The housing 20 has a cylindrical shape with a cap to house the armature 40. The housing 20 is made of metal, for example, iron. The housing 20 is made of iron, such that the housing 20 may serve as the yoke of the magnet 70.

The housing 20 has a housing cylindrical portion 21 and a housing flange portion 22. The housing cylindrical portion 21 has a cylindrical shape with a cap while having a lower opening portion 21a which is open toward the lower side. That is, the housing 20 has the lower opening portion 21a which is open at the lower portion thereof. The housing cylindrical portion 21 has the upper bearing holding portion 24 disposed at an upper end thereof. The upper bearing 71 is held on a radially inner side of the upper bearing holding portion 24.

A diameter of the housing cylindrical portion 21 is increased stepwise in an order of the upper bearing holding portion 24, a cylindrical shape part of the lower portion of the upper bearing holding portion 24, and a lower opening portion 21a. That is, according to this embodiment, the housing cylindrical portion 21 has a multi-stage cylindrical shape which has the cap and is concentric with the central shaft J.

The housing flange portion 22 extends radially outward from a lower end of the housing cylindrical portion 21. As illustrated in FIG. 1, the housing flange portion 22 has a mounting hole portion 25 and a fixed hole portion 26 which are hole portions axially penetrating through the housing flange portion 22.

The mounting hole portion 25 has a screw penetrated therethrough to mount the motor 10 on, for example, a vehicle body, etc. The fixed hole portion 26 has a screw 74 penetrated therethrough to fix the housing 20 and the bracket 30. The number of mounting hole portions 25 and the number of fixed hole portions 26 are not particularly limited. According to this embodiment, the housing flange portion 22 has, for example, three mounting hole portions 25. According to this embodiment, the housing flange portion 22 has, for example, two mounting hole portions 26.

As illustrated in FIGS. 2 and 3, the bracket 30 is positioned under the brush card assembly 50. The bracket 30 is fixed to the housing 20. The bracket 30 has a cylindrical shape. The bracket 30 is made of metal, for example, aluminum. As illustrated in FIG. 2, the bracket 30 has a bracket body 31 and fixed wall portions 32, 33, and 34.

As illustrated in FIG. 3, the bracket body 31 has a bracket bottom portion 31a, a bracket cylindrical portion 31b, a bracket flange portion 31c, the lower bearing holding portion 31d, the oil seal holding portion 31e, and a reinforcing wall 31h.

The bracket bottom portion 31a covers a lower portion of a brush card cylindrical portion 51 which will be described in more detail in a subsequent section. The bracket bottom portion 31a has a output shaft hole 31g penetrating through the center of the bracket bottom portion 31a in the axial direction. The shaft 41 penetrates through the output shaft hole 31g.

The bracket cylindrical portion 31b extends upwardly from a radial outer edge of the bracket bottom portion 31a. The bracket flange portion 31c extends radially outward from an upper end of the bracket cylindrical portion 31b.

The lower bearing holding portion 31d extends upwardly from the bracket bottom portion 31a. The lower bearing holding portion 31d is disposed on a radially outer side than the output shaft hole 31g. The lower bearing holding portion 31d has a cylindrical shape enclosing the shaft 41 in the circumferential direction. The lower bearing 72 is held inside the lower bearing holding portion 31d.

The oil seal holding portion 31e extends downwardly from the bracket bottom portion 31a. The oil seal holding portion 31e is disposed on a radially outer side than the output shaft hole 31g. The oil seal holding portion 31e has a cylindrical shape enclosing the shaft 41 in the circumferential direction. The oil seal 73 is held inside the oil seal holding portion 31e.

As illustrated in FIG. 2, the reinforcing wall 31h extends radially outward from an outer circumferential surface of the lower bearing holding portion 31d to before an inner circumferential surface of the bracket cylindrical portion 31b. That is, a radially outer end of the reinforcing wall 31h is positioned to be spaced radially inward from the inner circumferential surface of the bracket cylindrical portion 31b. In the example of FIG. 2, the reinforcing wall 31h is installed, for example, in six. The six reinforcing walls 31h are disposed at an equal distance in the circumferential direction. Even when a load is applied to the entire bracket 30 around the lower bearing 72, the reinforcing wall 31h may suppress the bracket 30 from being warped.

The fixed wall portions 32, 33, 34 are disposed on a radially outer edge of the bracket body 31. The fixed wall portions 32, 33, 34 further extend axially upwardly than the bracket flange portion 31c. As illustrated in FIGS. 2 and 4, the fixed wall portions 32, 33, 34 are positioned to be spaced apart from one another along the circumferential direction. The fixed wall portions 32 and 33 are disposed on portions opposite to each other across the center axis J. As illustrated in FIG. 4, the fixed wall portion 34 is circumferentially positioned between the fixed wall portion 32 and the fixed wall portion 33 in a counterclockwise direction (+θZ direction) of the center axis J.

The fixed wall portions 32, 33, 34 respectively have a mounting hole portion 36 which is a hole portion axially penetrating through the fixed wall portions 32, 33, 34. The mounting hole portion 36 axially overlaps with the mounting hole portion 25 of the housing 20. That is, a screw by which the motor 10 is mounted on, for example, a vehicle body, etc., passes through the mounting hole portion 25 of the housing 20 and the mounting hole portion 36 of the bracket.

The fixed wall portions 32 and 33 have fixed hole portions 37 which are hole portions axially penetrating through the fixed wall portion 32 and the fixed wall portion 33. The fixed hole portion 37 is, for example, a screw hole having a thread provided at an inside thereof. The fixed hole portion 37 axially overlaps with the fixed hole portion 26 of the housing 20. A screw 74 illustrated in FIG. 1 is pushed into the fixed hole portion 37, which is the screw hole, through the fixed hole portion 26 of the housing 20. By this, the housing 20 is fixed to the bracket 30.

Figure 5:
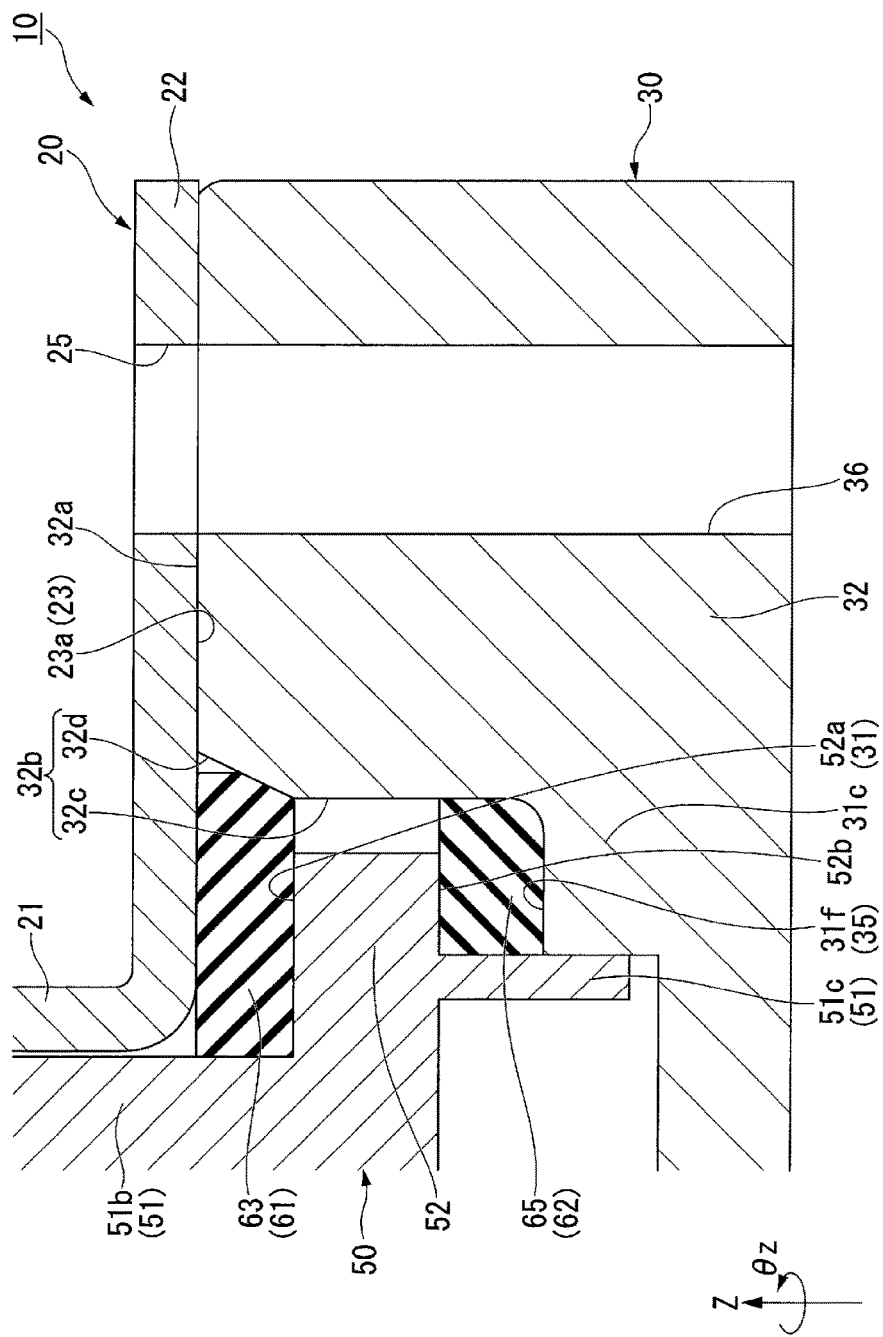
FIG. 5 is a cross-sectional view illustrating a portion of the motor according to the exemplary embodiment of the present disclosure.

FIG. 5 is a diagram illustrating a portion of the motor 10 and is a cross-sectional view illustrating a portion where the fixed wall portion 32 contacts the seal member 60. As illustrated in FIG. 5, a fixed wall portion inner side surface 32b which is a radially inner surface of the fixed wall portion 32 has an inner wall surface 32c and an inclined surface 32d. The inner wall surface 32c is the top surface of the bracket flange portion 31c, that is, a surface extending upwardly from a bracket side separation portion 31f.

The inclined surface 32d is connected to an upper end of the inner wall surface 32c and the top surface of the fixed wall portion 32, that is, to a bracket side contact portion 32a which will be described in more detail in a subsequent section. The inclined surface 32d is getting farther away from the center axis J as it goes from the bottom toward the top. The inclined surface 32d is a chamfered surface that a radially inner edge at the upper end of the fixed wall portion 32 is chamfered. Surfaces in the radial direction of the fixed wall portion 33 and the fixed wall portion 34 have an inner wall surface and an inclined surface, like the fixed wall portion 32.

As illustrated in FIG. 1, a housing lower end surface 23 which is a lower end surface of the housing 20 and a bracket upper end surface 35 which is an upper end surface of the bracket 30 face each other across the axial direction. The housing lower end surface 23 and the bracket upper end surface 35 have contact portions contacting each other and separation portions farther away from each other in an axial direction.

In detail, the housing lower end surface 23 has a housing side contact portion (contact portion) 23a and a housing side separation portion (separation portion) 23b. The housing side contact portion 23a is a contact portion contacting the bracket upper end surface 35. The housing side separation portion 23b is a separation portion far away from the bracket upper end surface 35 in an axial direction. According to this embodiment, the housing lower end surface 23 is the bottom surface of the housing flange portion 22.

As illustrated in FIG. 2, according to this embodiment, the bracket upper end surface 35 is a surface which includes the top surfaces of the fixed wall portions 32, 33, 34 and the top surface of the bracket flange portion 31c. The bracket upper end surface 35 has bracket side contact portions (contact portions) 32a, 33a, 34a and the bracket side separation portion (separation portion) 31f. The bracket side contact portions 32a, 33a, 34a are contact portions which contact the housing lower end surface 23. The bracket side separation portion 31f is a separation portion far away from the housing lower end surface 23 in the axial direction.

The bracket side contact portion 32a is the top surface of the fixed wall portion 32. The bracket side contact portion 33a is the top surface of the fixed wall portion 33. The bracket side contact portion 34a is the top surface of the fixed wall portion 34. That is, ends of the fixed wall portions 32, 33, 34, that is, upper ends thereof have contact portions. The bracket side separation portion 31f is the top surface of the bracket flange portion 31c.

As illustrated in FIGS. 1 and 2, the motor 10 is provided with radial openings 11a, 11b, and 11c. The radial openings 11a, 11b, 11c are positioned between the housing side separation portion 23b of the housing lower end surface 23 and the bracket side separation portion 31f of the bracket upper end surface 35. The radial openings 11a, 11b, 11c are open in the radial direction. The radial openings 11a, 11b, 11c are positioned in a region in which the housing 20 and the bracket 30 are bonded to each other, such that an inside space of the housing 20 and the bracket 30 communicates with an outside space of the housing 20 and the bracket 30.

As illustrated in FIG. 2, the radial opening 11a is positioned between the fixed wall portion 32 and the fixed wall portion 33 along the circumferential direction in a clockwise direction (−θZ direction) of the center axis J. The radial opening 11b is circumferentially positioned between the fixed wall portion 33 and the fixed wall portion 34 in a clockwise direction (−θZ direction) of the center axis J. The radial opening 11c is circumferentially positioned between the fixed wall portion 34 and the fixed wall portion 32 in the clockwise direction (−θZ direction) of the center axis J.

As illustrated in FIG. 1, the radial opening 11a is surrounded by the fixed wall portions which are adjacent to each other in the circumferential direction, that is, in case of the radial opening 11a, by the fixed wall portions 32 and 33, the housing side separation portion 23b, and the bracket side separation portion 31f. The radial opening 11a radially penetrates through the housing 20 and the bracket 30. These configurations are similarly applied to the radial openings 11b and 11c.

In FIG. 4, dimension L1 is a circumferential dimension of the radial opening 11a. Dimension L2 is a circumferential dimension of the radial opening 11b. Dimension L3 is a circumferential dimension of the radial opening 11b. Dimension L4 is a circumferential dimension of the bracket side contact portion 32. Dimension L5 is a circumferential dimension of the bracket side contact portion 33a. Dimension L6 is a circumferential dimension of the bracket side contact portion 34a.

In FIG. 4, dimensions L1, L2 and L3 are circumferential dimensions of the radial openings 11a, 11b, 11c which are respectively measured at each radial position of radially inner edges of the bracket side contact portions 32a, 33a, 34a. In the example of FIG. 4, dimensions L4, L5, L6 are circumferential dimensions at each position of the radial inner edges of the bracket side contact portions 32a, 33a, 34a.

A sum of circumferential dimensions L1, L2, and L3 of the radial openings 11a, 11b, 11c is larger than that of circumferential dimensions L4, L5 and L6 of the bracket side contact portions 32a, 33a, 34. Although not illustrated in the drawings, the sum of circumferential dimensions L1, L2, and L3 of the radial openings 11a, 11b, 11c is larger than that of the circumferential dimension of the housing side contact portion 23a. Dimension L1 is the largest one among circumferential dimensions L1, L2, and L3. Dimension L2 is substantially the same as dimension L3.

Further, the example shown in FIG. 4 describes a relationship among each circumferential dimension at the positions of the radial inner edges of the bracket side contact portions 32a, 33a, 34a in the radial direction, but said relationship is not limited thereto. At any radial position of the region in which the bracket side contact portions 32a, 33a, 34a and the radial opening portions 11a, 11b, 11c overlap with one another in the circumferential direction, the sum of the circumferential dimensions of the radial openings 11a, 11b, 11c is larger than that of the circumferential dimensions of the bracket side contact portions 32a, 33a, 34a. In other words, even on any concentric circle having its center on the center axis J, the sum of the circumferential dimensions of the radial openings 11a, 11b, 11c is larger than that of the circumferential dimensions of the bracket side contact portions 32a, 33a, 34a.

As illustrated in FIG. 3, the brush card assembly 50 is positioned in the lower opening portion 21a of the housing 20. As illustrated in FIGS. 2 and 4, the brush card assembly 50 has a brush card 50a, a brush 54, a choke coil 55, a connection terminal 56, and a spring 57.

Figure 6:
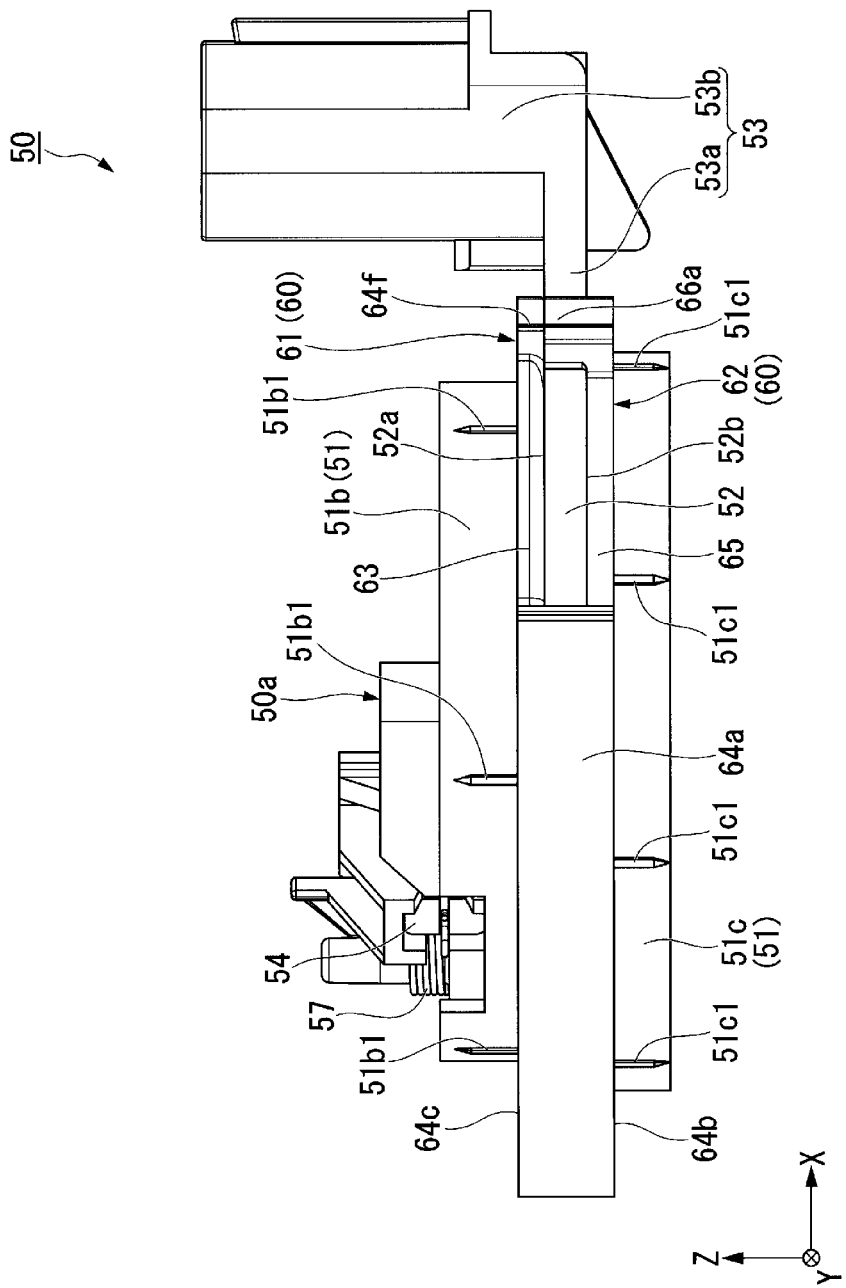
FIG. 6 is a side view illustrating a brush card assembly and a seal portion according to the exemplary embodiment of the present disclosure.

FIG. 6 is a side view (viewed from ZX) illustrating the brush card assembly 50 and the seal member 60. As illustrated in FIGS. 2 and 6, the brush card 50a has a brush card cylindrical portion 51, a brush card flange portion 52, and a connector part 53. That is, the brush card assembly 50 has the brush card cylindrical portion 51, the brush card flange portion 52, and the connector part 53. The brush card 50a may be made of, for example, synthetic resin.

As illustrated in FIGS. 2 and 3, the brush card cylindrical portion 51 has a cylindrical shape enclosing the shaft 41 in the circumferential direction. According to this embodiment, the brush card cylindrical portion 51 is, for example, a cylindrical shape which is concentric with the center axis J. The brush card cylindrical portion 51 has a circular portion 51a, an upper wall portion 51b, a lower wall portion 51c, a plurality of upper protrusions 51b1, and a plurality of lower protrusions 51c1.

The circular portion 51a has a circular shape enclosing the shaft 41. The circular portion 51a has a plate shape expanded in the radial direction. The circular portion 51a has a holding portion which holds the brush 54, the choke coil 55, the connection terminal 56, the spring 57, etc. The upper wall portion 51b extends upwardly from a radially outer edge of the circular portion 51a. As illustrated in FIG. 3, the upper wall portion 51b is fitted into the lower opening portion 21a of the housing 20. The lower wall portion 51c extends downwardly from the brush card flange portion 52. The lower wall portion 51c is fitted into the bracket cylindrical portion 31b of the bracket 30.

As illustrated in FIG. 2, the upper protrusions 51b1 are positioned on an outer circumferential surface of the upper wall portion 51b. The plurality of upper protrusions 51b1 are spaced apart from each other at a predetermined interval in the circumferential direction. The upper protrusions 51b1 extend in the axial direction. The upper protrusions 51b1 are deformed when the upper wall portion 51b is fitted in the lower opening portion 21a. By this, the state in which the upper wall portion 51b is fitted in the lower opening portion 21a can be good.

The lower protrusions 51c1 are positioned on an outer circumferential surface of the lower wall portion 51c. The plurality of lower protrusions 51c1 are spaced apart from each other at a predetermined interval in the circumferential direction. The lower protrusions 51c1 extend in the axial direction. The lower protrusions 51c1 are deformed when the lower wall portion 51c is fitted in an inside of the bracket cylindrical portion 31b. By this, the state in which the lower wall portion 51c is fitted in the bracket cylindrical portion 31b can be good.

The brush card flange portion 52 extends radially outward from the upper wall portion 51b, while the brush card flange portion 52 has a circular shape enclosing the upper wall portion 51b in the circumferential direction at a predetermined radial width. That is, the brush card flange portion 52 extends radially from the brush card cylindrical portion 51. The brush card flange portion 52 further extends radially outward than the housing cylindrical portion 21. The brush card flange portion 52 is positioned between the housing flange portion 22 and an axial direction of the bracket flange portion 31c.

As illustrated in FIG. 2, the connector part 53 protrudes radially outward from the brush card flange portion 52. That is, the connector part 53 is positioned on a radially outer side than the brush card flange portion 52. The connector part 53 has a connector connecting portion 53a and a connector cylindrical portion 53b. The connector connecting portion 53a connects between the brush card flange portion 52 and the connector cylindrical portion 53b. As illustrated in FIGS. 2 and 3, the top surface and the bottom surface of the brush card flange portion 52 and the top surface and the bottom surface of the connector connecting portion 53a are connected to each other on the same plane. As illustrated in FIG. 3, the connector connecting portion 53a is positioned in the radial opening 11c. That is, a portion of the connector part 53 is positioned in the radial opening 11c.

The connector cylindrical portion 53b has a cylindrical shape which extends upwardly from a radially outer end of the connector connecting portion 53a. The connector cylindrical portion 53b has a connector opening 53c which is open toward the upper side. The connector cylindrical portion 53b is exposed outside the housing 20 and the bracket 30. The connector cylindrical portion 53b is connected to an external power supply (not illustrated).

As illustrated in FIG. 4, the brush 54 is radially slidably provided in a box-shaped housing portion which is disposed on the top surface of the circular portion 51a. A radially outer end of the brush 54 is pressed radially inward by the spring 57. As illustrated in FIG. 3, a radially inner end of the brush 54 contacts the commutator 44. In FIG. 4, the brush card assembly 50 has, for example, two brushes 54.

The choke coil 55 is disposed on the top surface of the circular portion 51a. One end of the choke coil 55 is electrically connected to the brush 54. The other end of the choke coil 55 is electrically connected to the connection terminal 56.

The connection terminal 56 is held at the brush card 50a. The connection terminal 56 protrudes upwardly from the bottom portion of the connector opening 53c. The connection terminal 56 is electrically connected to the external power supply (not illustrated) connected to the connector part 53. By this, a current is supplied to the commutator 44 from the external power supply through the connection terminal 56, the choke coil 55, and the brush 54. That is, the brush card assembly 50 supplies a current to the armature 40. When being supplied with a current from the commutator 44, the armature 40 is excited. With this, a rotor including the armature 40 rotates by a magnetic interaction between the armature 40 and a magnet 70.

As illustrated in FIGS. 1 and 3, the seal member 60 is positioned between the housing 20 and the bracket 30. The seal member 60 is made of elastomer. According to this embodiment, a material of the seal member 60 may be made of, for example, thermosetting elastomer (rubber) and thermoplastic elastomer. As illustrated in FIG. 2, the seal member 60 has an upper seal portion 61 and a lower seal portion 62. According to this embodiment, the upper seal portion 61 and the lower seal portion 62 are, for example, separate members.

As illustrated in FIG. 3, the upper seal portion 61 is positioned over the brush card flange portion 52. The upper seal portion 61 seals between the brush card flange portion 52 and the housing 20. As illustrated in FIGS. 2 and 3, the upper seal portion 61 has a circular shape enclosing the shaft 41 in the circumferential direction. Therefore, it is possible to seal between the brush card flange portion 52 and the housing 20 over the whole in the circumferential direction. By this, it is possible to improve the waterproof property of the motor 10.

As illustrated in FIG. 2, the upper seal portion 61 has an upper ring portion 63, side wall portions (intervening portion) 64a and 64b, and an upper intervening portion (intervening portion) 64f. As illustrated in FIGS. 2 and 3, the upper ring portion 63 has a circular shape enclosing the upper wall portion 51b in the circumferential direction. According to this embodiment, the upper ring portion 63 is fitted into, for example, a radially outer side of the upper wall portion 51b. As illustrated in FIG. 5, the upper ring portion 63 is positioned between a brush card flange portion top surface 52a which is the top surface of the brush card flange portion 52 and the housing 20. That is, the upper seal portion 61 is positioned between the brush card flange portion top surface 52a and the housing 20.

According to this embodiment, an axial dimension of the upper ring portion 63 is, for example, uniform. The upper ring portion 63 contacts the brush card flange portion top surface 52a and the housing lower end surface 23. That is, the upper ring portion 63 is fitted in the brush card flange portion top surface 52a and the housing lower end surface 23 while contacting the brush card flange portion top surface 52a and the housing lower end surface 23.

An axial dimension between the brush card flange portion top surface 52a and the housing lower end surface 23 is smaller than that in an axial direction of the upper ring portion 63 at ordinary times (when being not applied with an external force). Therefore, when the upper ring portion 63 is fitted between the brush card flange portion top surface 52a and the housing lower end surface 23, the upper ring portion 63 is applied with a compressive force. By this, the upper ring portion 63 is expanded in the radial direction while being contracted in the axial direction.

A radially outer end of the upper ring portion 63 contacts the fixed wall portion inner side surface 32b. That is, the upper seal portion 61 contacts the fixed wall portion inner side surface 32b. Therefore, even when water is infiltrated between the housing side contact portion 23a and the bracket side contact portion 32a, it is possible to suppress water from being infiltrated into the brush card assembly 50 by the upper seal portion 61. In particular, since the upper ring portion 63 is expanded radially outward, an adhesion of the upper ring portion 63 to the fixed wall portion inner side surface 32b is more increased. By this, high sealing performance is realized.

According to this embodiment, the upper ring portion 63 contacts, for example, the inclined surface 32d. That is, the upper seal portion 61 contacts the inclined surface 32d. Therefore, even when an axial dimension of the upper seal portion 61 has an error, the upper seal portion 61 easily contacts any position of the inclined surface 32d. By this, it is possible to easily seal more certainly between the inclined surface 32d and the housing lower end surface 23.

According to this embodiment, the radially outer end of the upper ring portion 63 is fitted between the housing 20 and the bracket 30 through the inclined surface 32d while contacting the housing 20 and the bracket 30. Therefore, even when a dimension of the inclined surface 32d has an error, the upper ring portion 63 easily contacts at any position of the inclined surface 32d and the upper ring portion 63 is easily fitted between the housing 20 and the bracket 30. By this, according to this embodiment, even when the axial dimension of the upper ring portion 63 is uniform, the upper ring portion may be fitted between the housing 20 and the bracket 30 while being fitted between the brush card flange portion 52 and the housing 20. Therefore, according to the exemplary embodiment of the present disclosure, it is possible to secure waterproof property and simplify the shape of the upper seal portion 61.

As illustrated in FIG. 2, a side wall portion 64a extends downwardly from the upper ring portion 63. The side wall portion 64a extends along the circumferential direction. As illustrated in FIG. 3, the side wall portion 64a covers at least a portion on a radially outer side of the brush card flange portion 52. As illustrated in FIGS. 1 and 3, the side wall portion 64a is an intervening portion positioned in the radial opening 11a. That is, the seal member 60 has the intervening portion positioned in the radial opening 11a. The intervening portion includes the side wall portion 64a.

According to this embodiment, instead of a portion of the region in which the housing 20 contacts the bracket 30, the housing lower end surface 23 and the bracket upper end surface 35 have the separation portions far away from each other in the axial direction. Therefore, in the portion where the housing 20 is bonded to the bracket 30, the region in which the housing 20 and the bracket 30 contact each other may be reduced. Further, the radial opening 11a positioned between the housing side separation portion 23b and the bracket side separation portion 31f is provided with the intervening portion of the seal member 60, for example, the side wall portion 64a.

With this, in the radial opening 11a, the housing lower end 23 and the bracket upper end 35 contact each other through at least a portion of the seal member 60. Since the seal member 60 is made of elastomer, it is possible to more easily seal between the intervening portion of the seal member 60 and the housing lower end surface 23 and between the intervening portion of the seal member 60 and the bracket upper end surface 35 than the case in which the housing 20 made of metal and the bracket 30 made of metal contact each other. That is, a bonded portion between a metal surface and an elastomer surface has more excellent sealability than a bonded portion between the metal surfaces, since an adhesion between them is good due to the deformation of the elastomer. Therefore, in the radial opening 11a, it is possible to suppress water from being infiltrated between the housing lower end surface 23 and the bracket upper end surface 35.

Further, in the radial opening 11a, the seal member 60 adheres to the housing lower end surface 23 and the bracket upper end surface 35, such that water is not attached to the housing lower end surface 23 and the bracket upper end surface 35. By this, in the radial opening 11a, it is possible to prevent the housing lower end surface 23 and the bracket upper end 35 from corroding due to rust, etc.

By this, it is possible to suppress the housing 20 and the bracket 30 from corroding due to the infiltration of water between the housing 20 and the bracket 30. As a result, according to this embodiment, it is possible to obtain the motor 10 having a structure capable of improving waterproof property.

Further, for example, in the structure in which the bonded portion between the housing 20 and the bracket 30 is separated by intervening the circular elastomer therebetween over the whole of the circumferential direction, there is no portion where the housing 20 made of metal contacts the bracket 30 made of metal. The elastomer itself is elastically deformed, and therefore assembling precision of the housing 20 and the bracket 30 is likely to reduce.

In contrast, according to this embodiment, the contact portion where the housing 20 contacts the bracket 30 is installed, such that it is possible to suppress the assembling precision of the housing 20 and the bracket 30 from reducing.

Further, according to this embodiment, as described above, the sum of the circumferential dimensions L1, L2, L3 of the radial openings 11a, 11b, 11c is larger than that of the circumferential dimensions L4, L5, L6 of the bracket side contact portions 32a, 33a, 34a. Therefore, it is possible to make the region in which the housing 20 and the bracket 30 contact each other smaller. By this, it is possible to more suppress water from being infiltrated between the housing 20 and the bracket 30. Therefore, it is possible to more suppress the bracket side contact portions 32a, 33a, 34a and the housing side contact portion 23a from corroding while securing the assembling precision of the housing 20 and the bracket 30. As a result, according to this embodiment, it is possible to more improve the waterproof property of the motor 10.

Further, according to this embodiment, the intervening portion includes the side wall portion 64a covering at least a portion on a radially outer side of the brush card flange portion 52, such that it is possible to more suppress water from being infiltrated from the radial opening 11a into the brush card assembly 50.

As illustrated in FIG. 1, a radially outer surface of the side wall portion 64a is exposed outside the motor 10. A side wall portion top surface 64c which is the top surface of the side wall portion 64a contacts the housing side separation portion 23b. That is, the top surface of the intervening portion contacts the housing lower end surface 23. A side wall portion bottom surface 64d, which is the bottom surface of the side wall portion 64a, contacts the bracket side separation portion 31f. That is, the bottom surface of the intervening portion contacts the bracket upper end surface 35.

Therefore, it is possible to improve sealability between the housing lower end surface 23 and the side wall portion 64a and sealability between the bracket upper end surface 35 and the side wall portion 64a. As a result, it is possible to more improve the waterproof property of the motor 10.

According to this embodiment, the axial dimension of the side wall portion 64a at ordinary times (when being not applied with an external force) is larger than that in the axial direction between the housing side separation portion 23b of the housing lower end surface 23 and the bracket side separation portion 31f of the bracket upper end surface 35. Therefore, if the housing 20 and the bracket 30 are fixed, a compressive force in an axial direction is applied to the side wall portion 64a positioned in the radial opening 11a. By this, the side wall portion 64a is contracted in an axial direction, such that it is possible to improve the sealability between the housing lower end surface 23 and the side wall portion 64a and the sealability between the bracket upper end surface 35 and the side wall portion 64a. As a result, it is possible to more improve the waterproof property of the motor 10.

Further, the upper ring portion 63 is fitted between the brush card flange portion 52 and the housing lower end surface 23 and thus is applied with the compressive force, but the compressive force has connection with a fixed force when a predetermined screw is mounted in the mounting hole portion 25 and the fixed hole portion 37. That is, the mounting hole portion 25 and the fixed hole portion 37 are apart, the compressive force applied to the upper ring portion 63 is weak as much, such that the adhesion of the upper ring portion 63 is likely to reduce. However, since there is the side wall portion 64a, even though the adhesion of the upper ring portion 63 is reduced and thus an interval occurs, the infiltration of water stops. The side wall portion 64b may obtain the same effect as the side wall portion 64a, but the side wall portion 64a, of which the circumferential dimension is large, may obtain a more remarkable effect.

Figure 7:
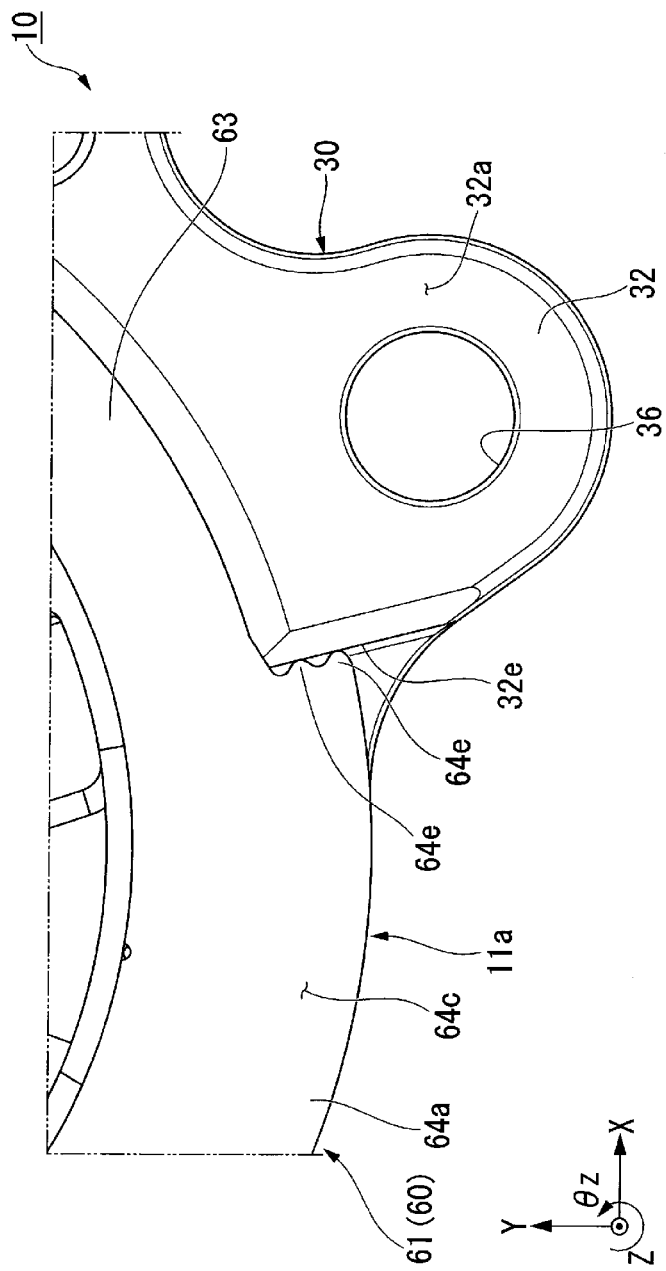
FIG. 7 is a plan view illustrating a portion of the motor according to the exemplary embodiment of the present disclosure.

FIG. 7 is a diagram illustrating a portion of the motor 10 and is a plan view illustrating the portion where the side wall portion 64a and the fixed wall portion 32 contact each other. FIG. 7 does not illustrate the housing 20. As illustrated in FIG. 7, the side surface in the circumferential direction of the side wall portion 64a contacts a fixed wall portion side surface 32e which is the side surface in the circumferential direction of the fixed wall portion 32. That is, the intervening portion contacts the fixed wall portion side surface 32e. Therefore, it is possible to suppress water from being infiltrated from a gap between the circumferential directions of the side wall portion 64a and the fixed wall portion 32 in the radial opening 11a.

Further, a dimension of the side wall portion 64a in the circumferential direction at ordinary times (when being not applied with an external force) is larger than the circumferential dimension L1 of the radial opening 11a. Therefore, if the side wall portion 64a is positioned in the radial opening 11a, the compressive force in the circumferential direction is applied to the side wall portion 64a. By this, the side wall portion 64a is contracted in the circumferential direction, such that the adhesion between the side wall portion 64a and the fixed wall portion side surface 32e may be excellent. Therefore, it is possible to more suppress water from being infiltrated from the gap between the circumferential directions of the side wall portion 64a and the fixed wall portion 32 in the radial opening 11a.

According to this embodiment, the side surface in the circumferential direction of the side wall portion 64a has a rib 64e. The rib 64e protrudes toward the fixed wall portion 32. In the example of FIG. 7, the side surface in the circumferential direction of the side wall portion 64a has, for example, two ribs 64e. An end of the rib 64e contacts the fixed wall portion side surface 32e. Therefore, it is possible to increase a pressure generated between the circumferential side surfaces of the side wall portion 64a and the fixed wall portion side surface 32e. By this, it is possible to more improve the sealability between the side wall portion 64a and the fixed wall portion 32.

The side wall portion 64b is an intervening portion positioned in the radial opening 11b. A dimension of the side wall portion 64b in the circumferential direction is smaller than, for example, that in the circumferential direction of the side wall portion 64a. Other configurations of the side wall portion 64b are the same as those of the side wall portion 64a.

As illustrated in FIG. 2, an upper intervening portion 64f extends radially outward from the upper ring portion 63. As illustrated in FIG. 3, the upper intervening portion 64f is an intervening portion positioned in the radial opening 11c. That is, according to this embodiment, the intervening portion includes the upper intervening portion 64f. The top surface of the upper intervening portion 64f contacts the housing side separation portion 23b. The bottom surface of the upper intervening portion 64f contacts the top surface of the connector connecting portion 53a.

The lower seal portion 62 is positioned between the brush card flange portion 52 and the bracket flange portion 31c. The lower seal portion 62 seals between the brush card flange portion 52 and the bracket 30. The lower seal 62 has a annular shape enclosing the shaft 41 in the circumferential direction. Therefore, it is possible to seal between the brush card flange portion 52 and the bracket 30 over the whole in the circumferential direction. By this, it is possible to improve waterproof property of the motor 10.

Like the upper seal portion 61, the lower seal portion 62 is also contracted in an axial direction but is expanded in the radial direction, such that the adhesion among the bottom surface of the brush card flange portion 52, the top surface of the bracket flange portion 31c, and the inner wall surface 32c may be good.

As illustrated in FIG. 2, the lower seal portion 62 has a lower ring portion 65, a lower intervening portion (intervening portion) 66c, and intervening protrusions (intervening portions) 66a and 66b. That is, according to this embodiment, the intervening protrusions 66a and 66b are disposed on the lower seal portion 62.

As illustrated in FIGS. 2 and 3, the lower ring portion 65 has a circular shape enclosing the lower wall portion 51c in the circumferential direction. According to this embodiment, the lower ring portion 65 is fitted into, for example, a radially outer side of the lower wall portion 51c. As illustrated in FIG. 5, the lower ring portion 65 is positioned between a brush card flange portion bottom surface 52b which is the bottom surface of the brush card flange portion 52 and the bracket 30. That is, the lower seal portion 62 is positioned between the brush card flange portion bottom surface 52b and the bracket 30.

As illustrated in FIG. 3, the lower ring portion 65 is disposed on a radially inner side of the side wall portion 64a. Although not illustrated in the drawings, the lower ring portion 65 is disposed on a radially inner side of the side wall portion 64b. Among the radially outer ends of the lower ring portion 65, a portion facing the side wall portion 64a contacts a radially inner surface of the side wall portion 64a. That is, the upper seal portion 61 and the lower seal portion 62 contact each other through the side wall portion 64a.

Therefore, it is possible to suppress water from being infiltrated from a boundary at which the upper seal portion 61 and the lower seal portion 62 contact each other. Further, since the lower seal portion 62 is disposed on a radially inner side of the side wall portion 64a, the boundary at which the upper seal portion 61 and the lower seal portion 62 contact each other is not positioned on a radially outer surface of the seal member 60. By this, it is possible to more suppress water from being infiltrated from the boundary at which the upper seal portion 61 and the lower seal portion 62 are in contact with each other.

As illustrated in FIG. 5, among the radially outer ends of the lower ring portion 65, a portion facing the fixed wall portion 32 contacts the fixed wall portion inner side surface 32b According to this embodiment, the lower ring portion 65 contacts the inner wall surface 32c. Although not illustrated in the drawings, among the radially outer ends of the lower ring portion 65, portions facing the side wall portions 33 and 34 contacts the radially inner surfaces.

The lower ring portion 65 contacts the brush card flange portion bottom surface 52b and the bracket upper end surface 35. As illustrated in FIG. 6, the bottom surface of the lower ring portion 65 is positioned on the same plane as the side wall portion bottom surface 64d. As illustrated in FIGS. 2 and 3, according to this embodiment, a dimension in the axial direction of the lower ring portion 65 is, for example, uniform.

As illustrated in FIG. 2, a lower intervening portion 66c extends radially outward from the lower ring portion 65. As illustrated in FIG. 3, the lower intervening portion 66c is the intervening portion positioned in the radial opening 11c. The top surface of the lower intervening portion 66c contacts the bottom surface of the connector connecting portion 53a. The bottom surface of the lower intervening portion 66c connects the bracket side separation portion 31f.

As illustrated in FIG. 2, intervening protrusions 66a and 66b protrude in the axial direction. In more detail, according to this embodiment, the intervening protrusions 66a and 66b protrude upwardly from the lower intervening portion 66c. The intervening protrusions 66a and 66b are intervening portions positioned in the radial opening 11c. That is, the intervening portion includes the intervening protrusions 66a and 66b.

As illustrated in FIG. 4, the intervening protrusion 66a is positioned between the circumferential directions of the connector part 53 and the fixed wall portion 32 and is also positioned between the axial directions of the housing flange portion 22 and the bracket flange portion 31c. The intervening protrusion 66b is positioned between the circumferential directions of the connector part 53 and the fixed wall portion 34 and is also positioned between the axial directions of the housing flange portion 22 and the bracket flange portion 31c. Therefore, it is possible to suppress water from being infiltrated from a gap between the circumferential directions of the connector part 53 and the fixed wall portions 32 and 34 in the radial opening 11c.

The intervening protrusion 66a contacts the fixed wall portion 32 and the connector connecting portion 53a. The circumferential dimension of the intervening protrusion 66a at ordinary times (when being not applied with an external force) is larger than, for example, the circumferential dimension between the connector connecting portion 53a and the fixed wall portion 32. Therefore, if the intervening protrusion 66a is positioned in the radial opening 11c, the compressive force in the circumferential direction is applied to the intervening protrusion 66a. By this, the intervening protrusion 66a is contracted in the circumferential direction, such that the adhesion between the intervening protrusion 66a and the connector connecting portion 53a and the adhesion between the intervening protrusion 66a and the fixed wall portion 32 may be good. Therefore, it is possible to more suppress water from being infiltrated from the gap between the circumferential directions of the connector part 53 and the fixed wall portion 32 in the radial opening 11c. This is similarly applied to the intervening protrusion 66b. The intervening protrusion 66b contacts the fixed wall portion 34 and the connector connecting portion 53a.

According to this embodiment, the intervening protrusions 66a and 66b have ribs 66d provided at both sides in the circumferential direction thereof. One of the ribs 66d of the intervening protrusion 66a contacts the fixed wall portion 32. The other rib 66d of the intervening protrusion 66a contacts the connector connecting portion 53a. The rib 66d is positioned in the radial opening 11c, such that the rib 66d may be deformed due to the compressive force applied to the intervening protrusion 66a. By this, it is possible to more improve the adhesion between the intervening protrusion 66a and the connector connecting portion 53a and the adhesion between the intervening protrusion 66a and the fixed wall portion 32. Therefore, it is possible to more suppress water from being infiltrated from the gap between the circumferential directions of the connector part 53 and the fixed wall portion 32 in the radial opening 11c. This is similarly applied to the intervening protrusion 66b.

In FIG. 4, the state before the rib 66d is deformed, that is, the state in which an external force is not applied to the rib 66d is illustrated by a dotted line.

As illustrated in FIG. 6, an upper end of the intervening protrusion 66a contacts the upper intervening portion 64f. A dimension obtained by adding an axial dimension of the intervening protrusion 66a at ordinary times (when being not applied with an external force) to an axial dimension of the upper intervening portion 64f at ordinary times is larger than, for example, the axial dimension between the housing flange portion 22 and the bracket flange portion 31c. Therefore, the housing 20 and the bracket 30 are fixed, such that the compressive force in the axial direction is applied to the intervening protrusion 66a and the upper intervening portion 64f. By this, the intervening protrusion 66a and the upper intervening portion 64f are contracted in the axial direction, such that the adhesion between the intervening protrusion 66a and the bracket flange portion 31c and the adhesion between the upper intervening portion 64f and the housing flange portion 22 may be good. Therefore, it is possible to more suppress water from being infiltrated from the gap between the circumferential directions of the connector part 53 and the fixed wall portions 32 and 34 in the radial opening 11c. This is similarly applied to the intervening protrusion 66b.

Further, according to this embodiment, the following configuration may also be adopted. In the following description, the same components as the description are properly denoted by the same reference numerals, and therefore the description thereof may be omitted.

According to this embodiment, at least one of the housing 20 and the bracket 30 may adopt a configuration in which the fixed wall portions 32, 33, 34 extend in an axial direction to have contact portions provided at ends thereof. That is, according to this embodiment, only the housing 20 may have the fixed wall portions 32, 33, 34 and both of the housing 20 and the bracket 30 may have the fixed wall portions 32, 33, 34.

When both of the housing 20 and the bracket 30 have the fixed wall portions 32, 33, 34, for example, the ends of the fixed wall portions 32, 33, 34 of the housing 20 contact the ends of the fixed wall portions 32, 33, 34 of the bracket 30. In this case, boundaries at which the fixed wall portions 32, 33, 34 of the housing 20 contact the fixed wall portions 32, 33, 34 of the bracket 30 may be positioned between the upper seal portion 61 and the lower seal portion 62 in the axial direction. Further, the upper seal portion 61 may also contact the radially inner surfaces of the fixed wall portions 32, 33, 34 of the housing 20 and the lower seal portion 62 may also contact the radially inner surfaces of the fixed wall portions 32, 33, 34 of the bracket 30.

Further, according to this embodiment, in the upper seal portion 61 and the lower seal portion 62, the seal member disposed on the other of the housing 20 and the bracket 30 for the brush card flange portion 52, that is, the side opposite to the side at which the fixed wall portions 32, 33, 34 are installed may be configured to contact the fixed wall portion inner surface 32b which is the radially inner surfaces of the fixed wall portions 32, 33, 34. That is, according to this embodiment, the fixed wall portions 32, 33, 34 are installed in the housing 20, such that the lower seal portion 62 may also contact the fixed wall portion inner surface 32b.

Further, according to this embodiment, the number of fixed wall portions 32, 33, 34 is not particularly limited and therefore the number of fixed wall portions 32, 33, 34 may be equal to or less than 2 and may be equal to or more than 4.

Further, according to this embodiment, the side wall portions 64a and 64b are installed at any one of the upper seal portion 61 and the lower seal portion 62, such that the radially outer end of the other upper seal portion 61 and the lower seal portion 62 may be configured to contact the radially inner surfaces of the side wall portions 64a and 64b. That is, according to this embodiment, the configuration illustrated in FIG. 8A may also be adopted.

Figure 8A:
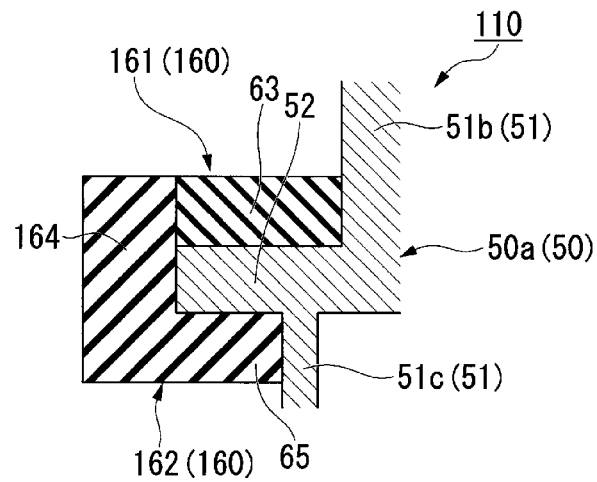
FIG. 8A is a cross-sectional view illustrating a portion of a motor according to another exemplary embodiment of the present disclosure.

FIG. 8A is a cross-sectional view illustrating a portion of a motor 110 which is another example of this embodiment. As illustrated in FIG. 8A, the motor 110 includes a seal member 160. The seal member 160 has an upper seal portion 161 and a lower seal portion 162.

The lower seal portion 162 has the lower ring portion 65 and a side wall portion (intervening portion) 164. The side wall portion 164 extends upwardly from a radially outer edge of the lower ring portion 65. Although not illustrated in the drawings, like the exemplary embodiment of FIG. 2, the side wall portion 164 is provided in, for example, two. The two side wall portions 164 each are the intervening portions positioned in the radial openings 11a and 11b. Other configurations of the side wall portion 164 are the same as those of the side wall portions 64a and 64b illustrated in FIG. 2, etc. Other configurations of the lower seal portion 162 are the same as those of the lower seal portion 62 illustrated in FIG. 2, etc.

The upper seal portion 161 has the upper ring portion 63. Unlike the upper seal portion 161 illustrated in FIG. 2, etc., the upper seal portion 161 does not have the side wall portions 64a and 64b. The upper ring portion 63 is disposed on a radially inner side of the side wall portion 164. A radially outer end of the upper ring portion 63 contacts an inside surface in the radial direction of the side wall portion 164. Other configurations of the upper seal portion 161 are the same as those of the upper seal portion 61 illustrated in FIG. 2, etc.

Figure 8B:
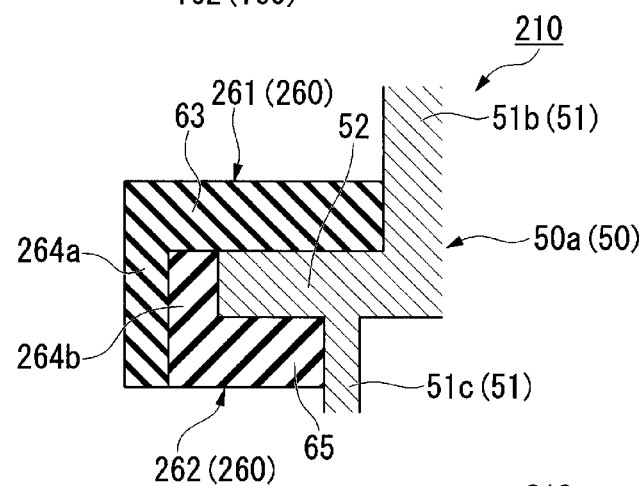
FIG. 8B is a cross-sectional view illustrating a portion of a motor according to another exemplary embodiment of the present disclosure.

Further, according to this embodiment, like a configuration illustrated in FIG. 8B, the side wall portions 64a and 64b may also be installed at both of the upper seal portion 61 and the lower seal portion 62. FIG. 8B is a cross-sectional view illustrating a portion of a motor 210 which is another example of this embodiment.

As illustrated in FIG. 8B, the motor 210 includes a seal member 260. The seal member 260 has an upper seal portion 261 and a lower seal portion 262. The upper seal portion 261 has the upper ring portion 63 and a side wall portion (intervening portion) 264a. The lower seal portion 262 has the lower ring portion 65 and a side wall portion 264b.

A radially inner surface of the side wall portion 264a of the upper seal portion 261 contacts a radially outer surface of the side wall portion 264b of the lower seal portion 262. Other configurations of the side wall portion 264a are the same as those of the side wall portions 64a and 64b illustrated in FIG. 2, etc.

An upper end of the side wall portion 264b of the lower seal portion 262 contacts the upper seal portion 261. The side wall portion 264b is disposed on a radially inner side of the side wall portion 264a of the upper seal portion 261. That is, the lower seal portion 262 is disposed on a radially inner side of the side wall portion 264a of the upper seal portion 261. A radially outer end of the lower seal portion 262 contacts a radially inner surface of the side wall portion 264a of the upper seal portion 261.

As such, according to this embodiment, the side wall portion 264a of the upper seal portion 261 and the side wall portion 264b of the lower seal portion 262 are installed while overlapping with one another in the radial direction. Although not illustrated in the drawings, like the exemplary embodiment of FIG. 2, the side wall portion 264a and the side wall portion 264b each are installed in, for example, two. The two side wall portions 264a and the two side wall portions 264b each are the intervening portions positioned in the radial openings 11a and 11b.

According to this embodiment, the radially outer surface of the brush card flange portion 52 may be covered with the side wall portion 264a extending downwardly and the side wall portion 264b extending upwardly, such that it is possible to more suppress water from being infiltrated into the brush card assembly 50.

Further, according to this embodiment, at the boundary at which the upper seal portion 261 contacts the lower seal portion 262, a distance from a surface of the seal member 260 to the brush card assembly 50 may be increased. Therefore, at the boundary at which the upper seal portion 261 contacts the lower seal portion 262, even when water is infiltrated from the surface of the seal member 260, it is possible to suppress water from arriving at the brush card assembly 50. By this, it is possible to more suppress water from being infiltrated into the brush card assembly 50.

Further, according to this embodiment, an area in which the upper seal portion 261 contacts the lower seal portion 262 may be increased, such that the upper seal portion 261 may stably contact the lower seal portion 262.

Further, according to this embodiment, the side wall portion 264a and the side wall portion 264b may be configured to overlap each other in an axial direction without overlapping with one another other in the radial direction. In this case, for example, a lower end of the side wall portion 264a and an upper end of the side wall portion 264b contact each other.

Figure 8C:
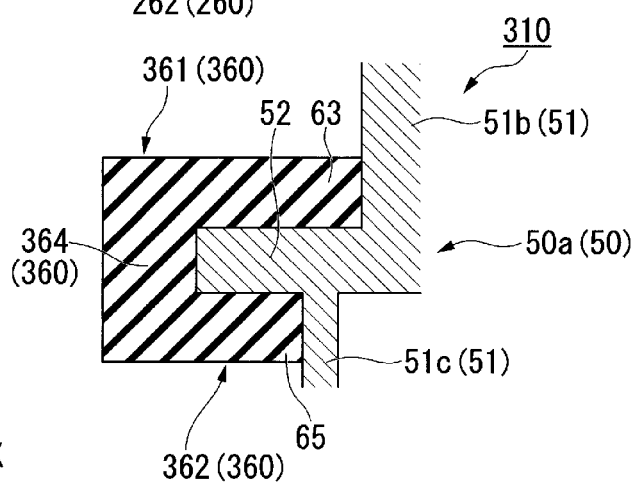
FIG. 8C is a cross-sectional view illustrating a portion of a motor according to another exemplary embodiment of the present disclosure.

Further, according to this embodiment, as the configuration illustrated in FIG. 8C, the seal member 60 may also be a single member. FIG. 8C is a cross-sectional view illustrating a portion of a motor 310 which is another example of this embodiment.

As illustrated in FIG. 8C, the motor 310 includes a seal member 360. The seal member 360 is a single member. The seal member 360 has an upper seal portion 361, a lower seal portion 361, and a side wall portion (intervening portion) 364.

The upper seal portion 361 has the upper ring portion 63. The lower seal portion 362 has the lower ring portion 65. The side connection part 364 connects between the upper seal portion 361 and the lower seal portion 362. That is, the upper seal portion 361 and the lower seal portion 362 are connected to each other through the side wall portion 364.

According to this embodiment, the seal member 360 is a single member, such that it is easy to manage the seal member 360. Further, the number of elements used to manufacture the motor 10 may be reduced and thus the number of assembling processes and manufacturing costs may be reduced. Further, since the seal member 360 is mounted to enclose the brush card flange portion 52, for example, when an assembling method of mounting the seal member 360 in the brush card 50a and then disposing the brush card assembly 50 in the bracket 30 is adopted, the situation that the seal member 360 is peeled off does not occur while the brush card assembly 50 is disposed. Therefore, according to this embodiment, it is possible to facilitate the assembling of the motor 310.

Further, since there is no boundary at which the upper seal portion 361 contacts the lower seal portion 362, the situation that water is infiltrated from the boundary at which the upper seal portion 361 contacts the lower seal portion 362 does not occur. Therefore, it is possible to more improve the waterproof property of the motor 10.

Further, the configuration of the seal member 360 is the same as the configuration of the seal member 60 illustrated in FIG. 2, etc., except for the fact that it is the single member.

Figure 9:
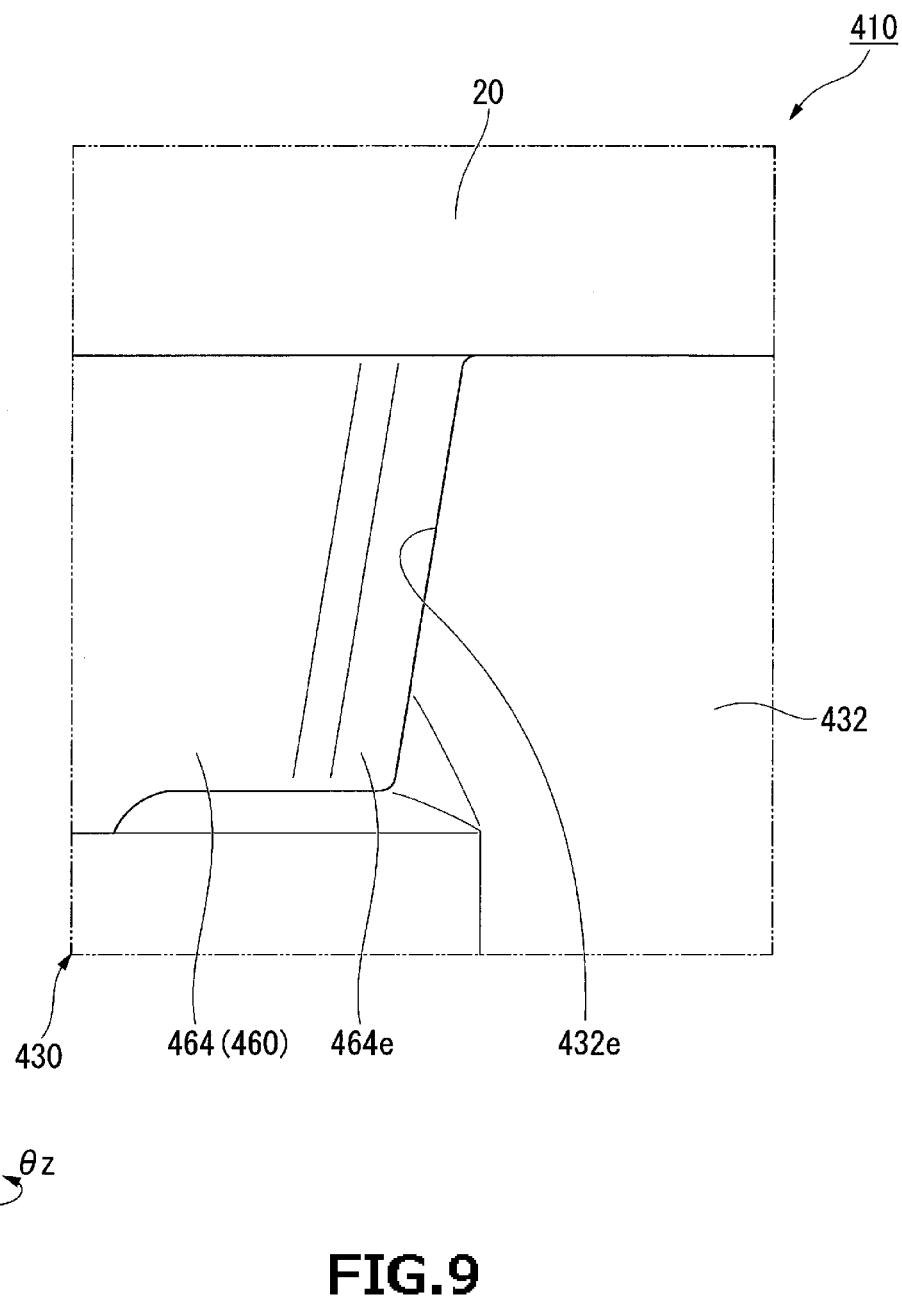
FIG. 9 is a side view illustrating a portion of the motor according to another exemplary embodiment of the present disclosure.

Further, this embodiment may adopt the configuration as illustrated in FIG. 9. FIG. 9 is a diagram illustrating a portion of a motor 410 which is another example of this embodiment. As illustrated in FIG. 9, the motor 410 includes the housing 20, a bracket 430, and a seal member 460.

The bracket 430 has a fixed wall portion 432. A fixed wall portion side surface 432e which is a side surface of the fixed wall portion 432 in the circumferential direction has an inclination with respect to an axial direction. In an example of FIG. 9, the fixed wall portion side surface 432e is an inclined surface positioned to be more adjacent to an opposite side to the seal member 460 as it goes from the bottom to the top. Other configurations of the bracket 430 are the same as those of the fixed wall portion 32 illustrated in FIG. 2, etc.

The seal member 460 has a side wall portion (intervening portion) 464 which is an intervening portion. A side surface of the side wall portion 464 in the circumferential direction has a rib 464e. The rib 464e has an inclination with respect to the axial direction. In the example of FIG. 9, the rib 464e is positioned to be more adjacent to the fixed wall portion 432 side as it goes from the bottom to the top. An end of the fixed wall portion 432 side of the rib 464e contacts the fixed wall portion side surface 432e. That is, in this configuration, a portion contacting the fixed wall portion side surface 432e at the side wall portion 464 which is the intervening portion has an inclination with respect to the axial direction.

According to this embodiment, when the compressive force in the axial direction is applied to the side wall portion 464 by the housing 20 and the bracket 30, some of the compressive force becomes a force pushing the side wall portion 464 toward the fixed wall portion 432. By this, it is possible to more improve the sealability between the side wall portion 464 and the fixed wall portion 432. Therefore, according to the configuration, the sealability between the side wall portion 464 and the fixed wall portion 432 is good, such that it is possible to prevent water from being infiltrated from the gap between the side wall portion 464 and the fixed wall portion 432.

Further, according to this embodiment, the sides in the circumferential directions of the side wall portions 64a and 64b may not have the rib 64e.

Further, according to this embodiment, the intervening protrusions 66a and 66b may be configured to be installed at at least one of the upper seal portion 61 and the lower seal portion 62. That is, according to this embodiment, the intervening protrusions 66a and 66b may be installed at the upper seal portion 61 and may also be installed at both of the upper seal portion 61 and the lower seal portion 62. When the intervening protrusions 66a and 66b are installed at the upper seal portion 61, the intervening protrusions 66a and 66b extend downwardly from, for example, the upper intervening portion 64f.

Further, according to this embodiment, upper ends of the intervening protrusions 66a and 66b may not contact the upper seal portion 61. Further, the number of intervening protrusions 66a and 66b is not particularly limited and therefore the number of intervening protrusions 66a and 66b may be 1 and may be equal to or more than 3.

Further, according to this embodiment, a material of the upper seal portion 61 and a material of the lower seal portion 62 may be different from each other.

Further, according to this embodiment, at least a portion of the connector part 53 may be configured to be positioned in the radial opening 11c. That is, according to this embodiment, the whole of the connector part 53 may also be positioned in the radial opening 11c. Further, according to this embodiment, the connector part 53 may also protrude radially outward from the brush card cylindrical portion 51.

Further, according to this embodiment, the housing 20 may not have the housing flange portion 22. Further, according to this embodiment, the bracket 30 may not have the bracket flange portion 31c.

Further, in the present specification, 'the intervening portion is positioned in the radial opening' means that the intervening portion is disposed on at least a portion of the radial opening.

Figure 10:
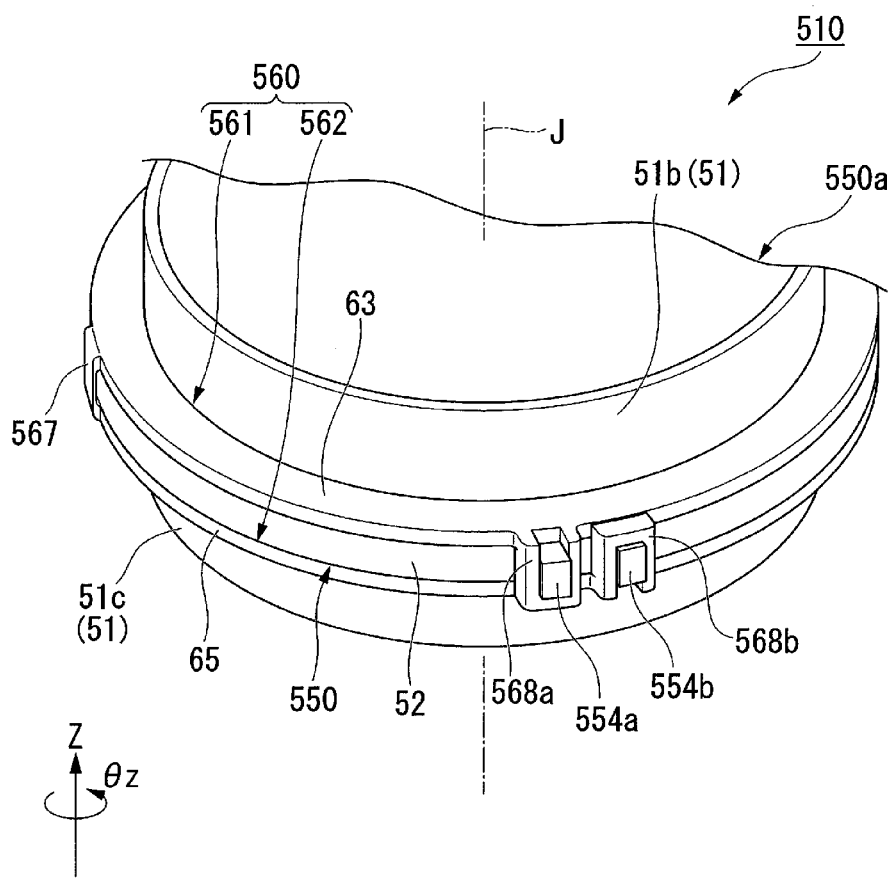
FIG. 10 is a perspective view illustrating a portion of the motor according to another exemplary embodiment of the present disclosure.

FIG. 10 is a perspective view illustrating a portion of a motor 510 according to another exemplary embodiment of the present disclosure. The exemplary embodiment illustrated in FIG. 10 is different from the exemplary embodiment illustrated in FIG. 1 in that an upper seal portion 561 and a lower seal portion 562 are connected to each other by a hinge portion 567. Further, components of the exemplary embodiment illustrated in FIG. 10 are properly denoted by the same reference numerals as those of the exemplary embodiment illustrated in FIG. 1, etc., and therefore the description thereof may be omitted.

As illustrated in FIG. 10, the motor 510 includes a brush card assembly 550 and a seal member 560. The brush card assembly 550 has a brush card 550a. The brush card 550a has the brush card cylindrical portion 51, the brush card flange portion 52, and brush card protrusions 554a and 554b. That is, the brush card assembly 550 has the brush card protrusions 554a and 554b.

The brush card protrusions 554a and 554b protrude radially outward from the brush card flange portion 52. The brush card protrusion 554a and the brush card protrusion 554b are at different positions in the circumferential direction. Shapes of the brush card protrusions 554a and 554b are not particularly limited and therefore the brush card protrusions 554a and 554b have, for example, a square pillar shape.

The seal member 560 has the upper seal portion 561, the lower seal portion 562, and the hinge portion 567. The seal member 560 is a single member. The hinge portion 567 connects between the upper seal portion 561 and the lower seal portion 562.

Therefore, the seal member 560 is a single member and a relative position of the upper seal portion 561 and the lower seal portion 562 may be changed by bending or unfolding the hinge portion 567. By this, it is possible to separately assemble the upper seal portion 561 and the lower seal portion 562 while easily managing the seal member 560. Therefore, it is possible to suppress the assembling performance of the motor 510 from reducing.

Further, according to this embodiment, for example, the seal member 560 is more easily molded than the case in which the seal member 560 is molded as a single member in the state in which the relative position of the upper seal portion 561 and the lower seal portion 562 is fixed.

The upper seal portion 561 has the upper ring portion 63 and an upper seal mounting portion 568a. The upper seal mounting portion 568a extends downwardly from the radially outer surface of the upper ring portion 63. The upper seal mounting portion 568a has a circular shape. According to this embodiment, the upper seal mounting portion 568a has, for example, a rectangular circular shape. The upper seal mounting portion 568a is locked to the brush card protrusion 554a.

Therefore, it is possible to stably mount the seal member 560 on the brush card 550a. Further, for example, when an assembling method of mounting the seal member 560 on the brush card 550a and then disposing the brush card assembly 550 in the bracket 30 is adopted, it is possible to suppress the seal member 560 from being peeled off while the brush card assembly 550 is disposed. Therefore, according to this embodiment, it is possible to facilitate the assembling of the motor 510.

The lower seal portion 562 has the lower ring portion 65 and a lower seal mounting portion 568b. The lower seal mounting portion 568b extends upwardly from the surface of a radially outer side the lower ring portion 65. The lower seal mounting portion 568b has a circular shape. According to this embodiment, the lower seal mounting portion 568b has, for example, a rectangular circular shape. The lower seal mounting portion 568b is locked to the brush card protrusion 554b.

That is, according to this embodiment, both of the upper seal portion 561 and the lower seal portion 562 are locked to the brush card protrusions 554a and 554b. Therefore, it is possible to more stably mount the seal member 560 on the brush card 550a.

Further, according to this embodiment, the following configuration may also be adopted.

According to this embodiment, at least one of the upper seal portion 561 and the lower seal portion 562 may be configured to be locked to the brush card protrusions 554a and 554b. That is, according to this embodiment, only either one of the upper seal portion 561 and the lower seal portion 562 may be configured to be locked to the brush card protrusions 554a and 554b. In this case, the brush card 550a has only either one of the brush card protrusions 554a and 554b. Further, only the locked seal portion of the upper seal portion 561 and the lower seal portion 562 has the upper seal mounting portion 568a or the lower seal mounting portion 568b.

Further, according to this embodiment, the seal member 560 may not be a single member. In this case, a material of the hinge portion 567 may be different from a material of the upper seal portion 561 and a material of the lower seal portion 562.

Further, each component of the exemplary embodiments illustrated in FIGS. 1 to 10 as described above may be properly combined within a range in which they conflict with each other.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor including a shaft having its center on a center axis extending in a vertical direction, comprising:
   an armature fixed to the shaft;
   a cylindrical housing comprising a lower opening portion which is open toward a lower side and accommodating the armature;
   a brush card assembly positioned in the lower opening portion and structured to supply a current to the armature;
   a cylindrical bracket positioned under the brush card assembly and fixed to the housing; and
   a seal member positioned between the housing and the bracket and made of elastomer,
   wherein the housing and the bracket are made of metal,
   the brush card assembly comprises a brush card cylindrical portion comprising a cylindrical shape and enclosing the shaft in a circumferential direction, and a brush card flange portion extending radially outward from the brush card cylindrical portion,
   the seal member comprises an upper seal portion positioned between a top surface of the brush card flange portion and the housing, and a lower seal portion positioned between a bottom surface of the brush card flange portion and the bracket,
   a housing lower end surface which is a lower end surface of the housing and a bracket upper end surface which is an upper end surface of the bracket face each other in an axial direction,
   the housing lower end surface and the bracket upper end surface comprise contact portions contacting each other and separation portions separated away from each other in the axial direction,
   the contact portions and the separation portions are alternately arranged in the circumferential direction,
   the motor is provided with a radial opening which is positioned axially between the separation portion of the housing lower end surface and the separation portion of the bracket upper end surface and is open in a radial direction, and
   the seal member has an intervening portion positioned in the radial opening.

2. The motor of claim 1, wherein a top surface of the intervening portion contacts the housing lower end surface, and a bottom surface of the intervening portion contacts the bracket upper end surface.

3. The motor of claim 1, wherein the upper seal portion and the lower seal portion have a circular shape enclosing the shaft in the circumferential direction.

4. The motor of claim 1, wherein the seal member is a single member and comprises a hinge portion which connects between the upper seal portion and the lower seal portion.

5. The motor of claim 1, wherein at least one of the housing and the bracket comprises a fixed wall portion which extends in the axial direction and comprises the contact portion provided at an end thereof, the brush card assembly comprises a connector part disposed on a radially outer side than the brush card flange portion, at least a portion of the connector part is positioned in the radial opening, the intervening portion comprises an intervening protrusion which is disposed on at least one of the upper seal portion and the lower seal portion and protrudes in an axial direction, and the intervening protrusion is positioned between the connector part and the circumferential direction of the fixed wall portion.

6. The motor of claim 1, wherein the brush card assembly comprises a brush card protrusion protruding radially outward from the brush card flange portion, and at least one of the upper seal portion and the lower seal portion is locked to the brush card protrusion.

7. The motor of claim 1, wherein a sum of circumferential dimensions of the radial opening is larger than that of circumferential dimensions of the contact portion.

8. The motor of claim 1, wherein at least one of the housing and the bracket comprises a fixed wall portion which extends in an axial direction and comprises the contact portion provided at an end thereof, and the intervening portion contacts a fixed wall portion side surface which is a side surface in the circumferential direction of the fixed wall portion.

9. The motor of claim 8, wherein a portion contacting the fixed wall portion side surface at the intervening portion comprises an inclination with respect to the axial direction.

10. The motor of claim 1, wherein any one of the housing and the bracket comprises a fixed wall portion which extends in the axial direction and comprises the contact portion provided at an end thereof, and the seal member disposed on the other one of the housing and the bracket for the brush card flange portion among the upper seal portion and the lower seal portion contacts a fixed wall portion inner side surface which is a radially inner surface of the fixed wall portion.

11. The motor of claim 10, wherein the fixed wall portion inner side surface comprises an inclined surface farther away from the center axis as it goes from the bottom toward the top, and the upper seal portion contacts the inclined surface.

12. The motor of claim 1, wherein the intervening portion includes a side wall portion covering at least a portion of a radially outer side of the brush card flange portion.

13. The motor of claim 12, wherein the seal member is a single member, and the upper seal portion and the lower seal portion are connected to each other through the side wall portion.

14. The motor of claim 12, wherein the upper seal portion and the lower seal portion contact each other through the side wall portion.

15. The motor of claim 14, wherein the side wall portion is disposed on any one of the upper seal portion and the lower seal portion, and a radial end of the other one of the upper seal portion and the lower seal portion contacts a radially inner surface of the side wall portion.

16. A motor including a shaft having its center on a center axis extending in a vertical direction, comprising:
an armature fixed to the shaft;
a cylindrical housing comprising a lower opening portion which open toward a lower side and accommodating the armature;
a brush card assembly positioned in the lower opening portion and structured to supply a current to the armature;
a cylindrical bracket positioned under the brush card assembly and fixed to the housing; and
a seal member positioned between the housing and the bracket and made of elastomer,
wherein the housing and the bracket are made of metal, the brush card assembly comprises a brush card cylindrical portion having a cylindrical shape and enclosing the shaft in a circumferential direction and a brush card flange portion extending radially outward from the brush card cylindrical portion,
the seal member comprises an upper seal portion positioned between the top surface of the brush card flange portion and the housing, and a lower seal portion positioned between the bottom surface of the brush card flange portion and the bracket,
a housing lower end surface, which is a lower end surface of the housing, and a bracket upper end surface, which is an upper end surface of the bracket, face each other in an axial direction,
the housing lower end surface and the bracket upper end surface comprise contact portions contacting each other and separation portions separated away from each other in the axial direction,
the contact portions and the separation portions are alternately arranged in the circumferential direction,
the motor is provided with a radial opening which is positioned axially between the separation portion of the housing lower end surface and the separation portion of the bracket upper end surface and is open in the radial direction,
the seal member comprises an intervening portion positioned in the radial opening,
the upper seal portion and the lower seal portion comprise a circular shape enclosing the shaft in the circumferential direction,
the intervening portion is a side wall portion which is positioned in the upper seal and covers at least a portion of a radially outer side of the brush card flange portion, and
the lower seal portion contacts the upper seal portion through the side wall portion.

17. The motor of claim 16, wherein at least one of the housing and the bracket comprises a fixed wall portion which extends in the axial direction and has the contact portion provided at an end thereof, and
the intervening portion contacts a fixed wall portion side surface which is a side surface in the circumferential direction of the fixed wall portion.

18. The motor of claim 17, wherein any one of the housing and the bracket comprises a fixed wall portion which extends in the axial direction and comprises the contact portion provided at an end thereof, and the seal member disposed on the other housing and the bracket for the brush card flange portion among the upper seal portion and the lower seal portion contacts a fixed wall portion inner side surface which is a radially inner surface of the fixed wall portion.

19. The motor of claim 18, wherein at least one of the housing and the bracket comprises a fixed wall portion which extends in the axial direction and comprises the contact portion provided at an end thereof, the brush card assembly comprises a connector part disposed on a radially outer side than the brush card flange portion, at least a portion of the connector part is positioned in the radial opening, the intervening portion comprises an intervening protrusion which is disposed on at least one of the upper seal portion and the lower seal portion and protrudes in an axial direction, and the intervening protrusion is positioned between the connector part and the circumferential direction of the fixed wall portion.

20. The motor of claim 19, wherein a sum of circumferential dimensions of the radial opening is larger than that of circumferential dimensions of the contact portion.

* * * * *